United States Patent
Palinkas et al.

(10) Patent No.: US 8,061,398 B2
(45) Date of Patent: *Nov. 22, 2011

(54) NON-PNEUMATIC TIRE HAVING ANGLED TREAD GROOVE WALL

(75) Inventors: Richard L. Palinkas, Northfield, CT (US); Ian Laskowitz, Woodbury, CT (US); George H. Nybakken, Middlebury, CT (US)

(73) Assignee: Chemtura Corporation, Middlebury, CT (US)

( * ) Notice: Subject to any disclaimer, the term of this patent is extended or adjusted under 35 U.S.C. 154(b) by 268 days.

This patent is subject to a terminal disclaimer.

(21) Appl. No.: 12/257,740

(22) Filed: Oct. 24, 2008

(65) Prior Publication Data

US 2009/0211678 A1    Aug. 27, 2009

Related U.S. Application Data

(63) Continuation-in-part of application No. 12/036,939, filed on Feb. 25, 2008.

(51) Int. Cl.
*B60C 7/00* (2006.01)
(52) U.S. Cl. ............... 152/324; 152/5; 152/323
(58) Field of Classification Search .......... 152/1, 5, 152/7, 323, 324, 325, 327, 328, 209.12, 209.18, 152/209.28
See application file for complete search history.

(56) References Cited

U.S. PATENT DOCUMENTS

| | | |
|---|---|---|
| 763,909 A | 6/1904 | Krotz |
| 767,041 A | 8/1904 | Curfman |
| 1,067,744 A | 7/1913 | Lane |
| 1,103,813 A | 7/1914 | Murray |
| 1,258,461 A | 3/1918 | Reid |
| 1,261,120 A | 4/1918 | Gries |
| 1,299,205 A | 1/1919 | Morgan |
| 1,334,493 A | 3/1920 | Holahan |
| 1,340,244 A | 5/1920 | Osborne |
| 1,360,119 A | 11/1920 | Krotz |
| 1,414,252 A | 4/1922 | Brubaker |
| 1,470,922 A | 10/1923 | Hulse |
| 1,641,150 A * | 9/1927 | Brubaker ............ 152/324 |
| 2,233,562 A | 3/1941 | Tannewitz |
| D201,238 S | 5/1965 | Fishman |
| 3,219,090 A | 11/1965 | Cislo |
| 3,248,372 A | 4/1966 | Bunge |

(Continued)

FOREIGN PATENT DOCUMENTS

EP        28350 A1 *   5/1981

(Continued)

OTHER PUBLICATIONS

Machine Translation of EP0028350A1.*

(Continued)

*Primary Examiner* — Kip T Kotter
(74) *Attorney, Agent, or Firm* — JoAnn Villamizar

(57) ABSTRACT

A non-pneumatic tire comprising side cavities that are staggered with respect to laterally opposing side cavities, and laterally extending tread grooves that are either in substantial radial alignment with the cavities or substantially offset relative to the cavities. The tread grooves have at least one wall that is angled with respect to the radial direction, i.e., the direction relative to the tire's axis of rotation. The wall may be an open angle having an angle of 5° to 65° relative to the radial direction. Also provided are processes for making such tires and to off-the-road (OTR) vehicles employing such tires.

20 Claims, 20 Drawing Sheets

U.S. PATENT DOCUMENTS

| | | | |
|---|---|---|---|
| 3,384,624 A | 5/1968 | Heiss | |
| 4,061,662 A | 12/1977 | Marans et al. | |
| 4,101,473 A | 7/1978 | Lander | |
| 4,164,251 A | 8/1979 | Chung | |
| 4,182,825 A | 1/1980 | Jakle | |
| 4,226,273 A | 10/1980 | Long et al. | |
| 4,288,577 A | 9/1981 | McShane, Jr. | |
| 4,385,171 A | 5/1983 | Schnabel et al. | |
| 4,624,996 A | 11/1986 | Rizk et al. | |
| 4,784,201 A | 11/1988 | Palinkas et al. | |
| 4,832,098 A | 5/1989 | Palinkas et al. | |
| 4,888,442 A | 12/1989 | Dunlap et al. | |
| 4,921,029 A * | 5/1990 | Palinkas et al. | 152/11 |
| 4,934,425 A | 6/1990 | Gajewski et al. | |
| 4,945,962 A | 8/1990 | Pajtas | |
| 5,023,040 A | 6/1991 | Gajewski et al. | |
| 5,077,371 A | 12/1991 | Singh et al. | |
| 5,139,066 A * | 8/1992 | Jarman | 152/7 |
| D329,413 S | 9/1992 | Chandler | |
| 5,223,599 A | 6/1993 | Gajewski | |
| 5,265,659 A | 11/1993 | Pajtas et al. | |
| 5,343,916 A | 9/1994 | Duddey et al. | |
| 5,390,985 A | 2/1995 | Chandler | |
| 5,460,213 A | 10/1995 | Pajtas | |
| 5,605,657 A | 2/1997 | Nybakken et al. | |
| 5,676,900 A | 10/1997 | Pajtas | |
| 5,703,193 A | 12/1997 | Rosenberg et al. | |
| D401,896 S | 12/1998 | Chandler et al. | |
| D410,603 S | 6/1999 | Chandler et al. | |
| 6,170,544 B1 | 1/2001 | Hottebart | |
| D455,996 S | 4/2002 | Buckley | |
| 6,681,822 B2 | 1/2004 | Adams et al. | |
| 6,723,771 B2 | 4/2004 | Palinkas et al. | |
| 6,802,922 B1 * | 10/2004 | Ueda et al. | 156/128.6 |
| D498,203 S | 11/2004 | Taylor et al. | |
| D499,065 S | 11/2004 | Shapiro et al. | |
| 6,845,796 B2 | 1/2005 | Katoh et al. | |
| 6,868,880 B2 | 3/2005 | Cummins | |
| 7,013,939 B2 | 3/2006 | Rhyne et al. | |
| D536,298 S | 2/2007 | Becker et al. | |
| 7,174,934 B2 | 2/2007 | Hill, III et al. | |
| 7,174,936 B2 | 2/2007 | Becker et al. | |
| 7,201,194 B2 | 4/2007 | Rhyne et al. | |
| D548,681 S | 8/2007 | Becker et al. | |
| 2002/0092589 A1 | 7/2002 | Katoh et al. | |
| 2003/0065124 A1 | 4/2003 | Rosenberg et al. | |
| 2006/0137795 A1 | 6/2006 | Hill, III | |
| 2007/0089820 A1 | 4/2007 | Gabrys et al. | |
| 2007/0119531 A1 | 5/2007 | Steinke et al. | |
| 2007/0213497 A1 | 9/2007 | Nagaraj et al. | |
| 2007/0215259 A1 | 9/2007 | Burns | |
| 2007/0267116 A1 | 11/2007 | Rhyne et al. | |
| 2009/0107596 A1 | 4/2009 | Palinkas et al. | |
| 2010/0147427 A1 * | 6/2010 | Ishiyama | 152/209.25 |

FOREIGN PATENT DOCUMENTS

| | | |
|---|---|---|
| EP | 159888 | 10/1985 |
| EP | 245789 | 11/1987 |
| EP | 297628 | 1/1989 |
| EP | 334522 | 9/1989 |
| EP | 353006 | 1/1990 |
| EP | 399383 | 11/1990 |
| EP | 502353 | 9/1992 |
| EP | 1420964 | 5/2004 |
| GB | 14087 | 4/1912 |
| GB | 120589 | 11/1918 |
| GB | 228495 | 11/1925 |
| GB | 1101410 | 1/1968 |
| GB | 2431383 | 4/2007 |
| JP | 06-016767 | 7/1991 |
| JP | 08-176252 | 7/1996 |
| UA | A1 23940 | 5/1993 |
| WO | 8905736 | 6/1989 |
| WO | 9514582 | 6/1995 |
| WO | 9718959 | 5/1997 |
| WO | 9843833 | 10/1998 |
| WO | 03018332 | 3/2003 |
| WO | 2008009042 | 1/2008 |

OTHER PUBLICATIONS

WO 91/17899 A (Altrack Ltd) [AU] Nov. 28, 1991. p. 7, Paragraph 1; Figure 4.

International Search Report and Written Opinion for PCT/US2008/081111 mailed Jan. 28, 2009.

International Preliminary Report on Patentability for PCT/US2008/081111 mailed Feb. 2, 2010.

United States Patent and Trademark Office, Office Action mailed Sep. 30, 2009 for U.S. Appl. No. 12/036,939, 14 pp.

United States Patent and Trademark Office, Response to Office Action mailed Sep. 30, 2009 for US2009/0107596, filed electronically Dec. 30, 2009, 12 pp.

United States Patent and Trademark Office, Office Action mailed Feb. 18, 2010 for U.S. Appl. No. 12/036,939, 10 pp.

United States Patent and Trademark Office, Response to Office Action mailed Feb. 18, 2010 for for U.S. Appl. No. 12/036,939, filed Jun. 18, 2010, 11 pp.

United States Patent and Trademark Office, Office Action mailed Jun. 28, 2010 for U.S. Appl. No. 12/036,939, 8 pp.

International Preliminary Examination Report for PCT/US00/30062 dated Apr. 3, 2002, 5 pp.

Kilinger, T., Controlling Dermal Exposure to Isocyanates: Maintaining the PMA's Leadership in Health and Safety, a paper presented at the Polyurethan Manufacturer Association Meeting, Baltimore, Maryland, Oct. 1998.

Lamba, N. et al., Polyurethanes in Biomedical Applications, CRC Press LLC, 1998.

Wester, R., et al. Toxicol Sci. 48(1): 1-4, 1999.

Chemtura Corp., Technical Information, "Adiprene LFM 2450", Nov. 26, 2007.

Nybakken, "Premium Blocked PU System for Pouring Very Large Parts", Polyurethane Manufacturers Association, May 6, 2008.

Nybakken, "performance Advantages of LFM Prepolymers Cured with Blocked Methylene Diamine", Polyurethane Manufacturers Association, Apr. 16, 2007.

International Search Report for PCT/US2009/033986 mailed Sep. 3, 2009.

* cited by examiner

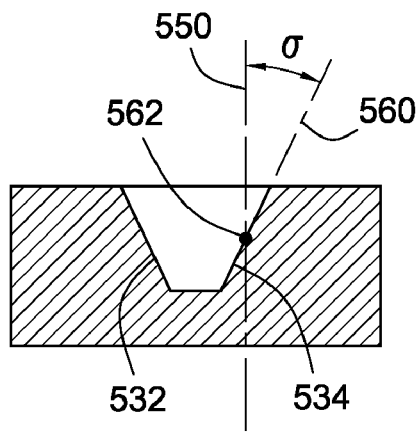
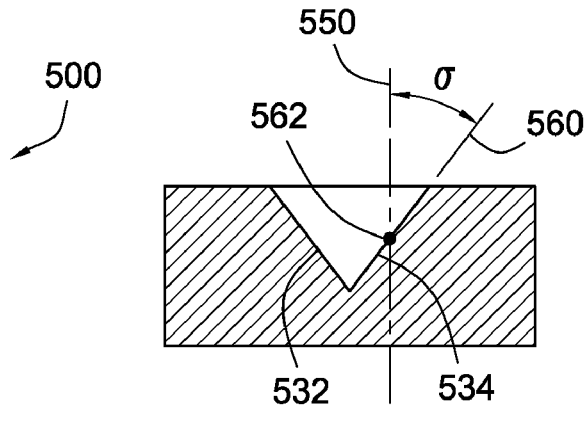
FIG. 5A  FIG. 5B
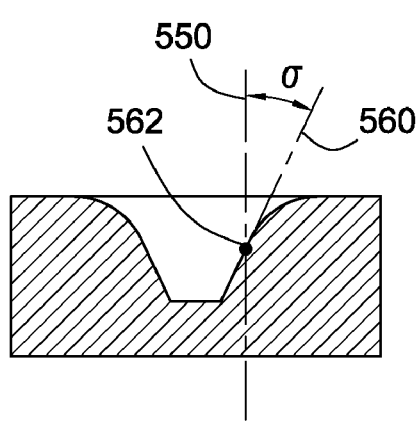
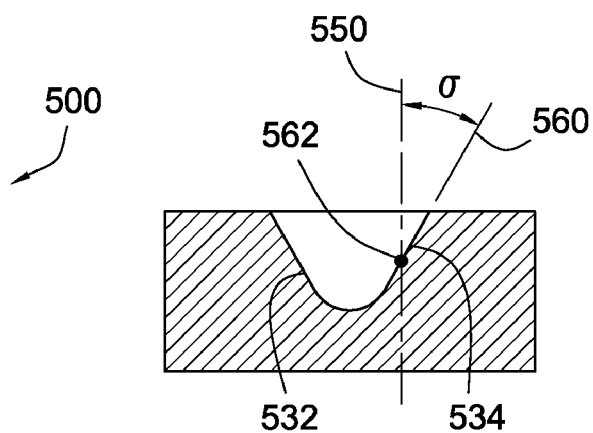
FIG. 5C  FIG. 5D
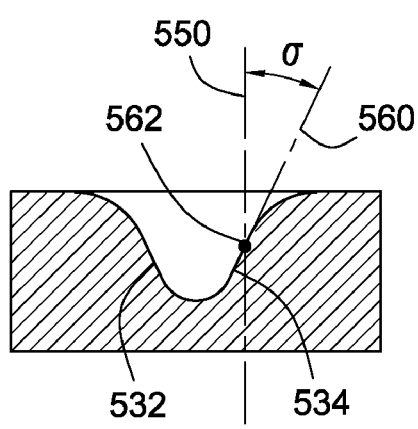
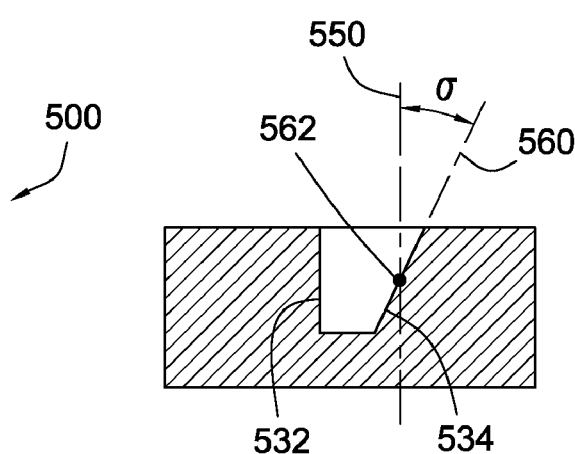
FIG. 5E  FIG. 5F

NON-PNEUMATIC TIRE HAVING ANGLED TREAD GROOVE WALL

CROSS-REFERENCE TO RELATED APPLICATIONS

This is a continuation-in-part of U.S. application Ser. No. 12/036,939, entitled "Non-Pneumatic Tire," filed Feb. 25, 2008, which claims priority to U.S. Design application No. 29/296,763, filed Oct. 26, 2007, and U.S. Design application No. 29/298,667, filed Dec. 10, 2007. The entireties of each of these applications are incorporated herein by reference.

BACKGROUND OF THE INVENTION

1. Field of the Invention

This invention relates to tires and more particularly to non-pneumatic tires that preferably are suitable for off-the-road vehicles. The non-pneumatic tires may have at least one angled tread groove wall.

2. Discussion of the Background Information

Off-the-road (OTR) vehicles, also known as off-highway vehicles, are commonly used in rugged terrain for mining, excavation, construction, military applications, and other heavy industrial applications. OTR vehicles include tractors, trucks, loaders, dozers, graters, excavators, etc., and may have operational weights as high as 380 to 460 tons. Typically such OTR vehicles have several inflatable tires made of rubber. These applications require that each tire have properties such as being puncture-proof, able to carry relatively heavy loads, and good resistance to wear and tear. Conventional inflatable tires generally have short operational life spans of about six months. Further, the typical rugged operating environment for OTR vehicles exposes the tires to possible failures, such as punctures, blowouts, tears, and separation of the tire from the rim. Thus, the time and cost to maintain such OTR vehicles increases because the inflatable tires need to be replaced due to normal wear and tire failure. For mining vehicles, for example, shortages of suitable replacement tires may cause a mine operator to shut down production while waiting for new replacement tires. This may cause particular hardships for remotely located mines that receive sporadic or irregular shipments of new supplies.

While improvements in the durability of such inflatable tires continue to be made, such tires are still exposed to normal wear and failure. Thus, the need exists for tires suitable for OTR vehicles that overcome the shortcomings of conventional inflatable tires.

One solution is to use a solid non-pneumatic tire. Urethane elastomers have been used in the manufacture of solid tires for applications such as industrial tires, off-the-road tires, bicycles tires, etc. Urethane tires, however, have not been entirely satisfactory in such applications because they do not have desirable cushioning and handling characteristics. Also, such solid tires suffer from internal heat build-up and subsequent degradation of the elastomer material in prolonged high speed service conditions or under rough terrain situations where the tire is being deformed. Various non-pneumatic tire designs have been proposed to overcome these limitations of pneumatic tires and solid non-pneumatic tires.

Some designs of non-pneumatic tires have cavities formed into the sidewall, such as those described in International Publications WO2008/009042 and WO97/18959, U.S. Publication No. 2007/0215259, U.S. Pat. Nos. 7,174,936, 5,676,900, 5,343,916, 5,223,599, 5,139,066, 5,023,040, 4,921,029, 4,784,201, and EP Publication 0399383, the entire contents and disclosures of which are hereby incorporated by reference. Metal bands are often used as a reinforcement means to provide support in these non-pneumatic tire designs. Also, some of the non-pneumatic tires incorporate a separate rubber tread.

Some designs of non-pneumatic tires have resilient members that create openings laterally through the sidewall, such as those described in U.S. Publication No. 2007/0089820 and U.S. Pat. Nos. 7,201,194, 7,013,939, 6,681,822, 6,170,544, 4,945,962, 4,226,273, and 3,219,090, and EP Publication 0353006, the entire contents and disclosures of which are hereby incorporated by reference.

Various tire ornamental designs for pneumatic and non-pneumatic tires, including industrial tires, have also been proposed, such as those shown in U.S. Design Pat. No. D201,238, D329,413, D401,896, D410,603, D455,996, D498,203, D499,065, D536,298, and D548,681, the entire contents and disclosures of which are hereby incorporated by reference. These ornamental designs fail to address the need for improved function of non-pneumatic tires.

However, there is still a need for improved non-pneumatic tires, particularly for use in large off-the-road vehicles.

BRIEF SUMMARY OF THE INVENTION

In a first aspect of the present invention, there is provided a non-pneumatic tire comprising: side cavities that are staggered with respect to laterally opposing side cavities; and laterally extending tread grooves in substantial radial alignment with the cavities, wherein each tread groove comprises a first wall having a first angle of 5° to 65° relative to the radial direction. In one embodiment, each of the tread grooves also has a second wall having a second angle of 5° to 65° relative to the radial direction.

In a second aspect of the present invention, there is provided a non-pneumatic tire comprising: side ribs that are staggered with respect to laterally opposing side ribs; and laterally extending tread grooves that are substantially radially offset relative to the side ribs, wherein each of the tread grooves has a first wall having an angle of 5° to 65° relative to the radial direction. In one embodiment, each of the tread grooves also has a second wall having a second angle of 5° to 65° relative to the radial direction.

In a third aspect of the present invention, there is provided a non-pneumatic tire comprising: an inner circumferential member; an outer circumferential member; a central web connecting the inner and outer circumferential members; ribs extending from opposing sidewalls to the central web and defining side cavities, wherein ribs on one side of the central web are staggered relative to ribs on an opposite side of the central web; and laterally extending tread grooves disposed within an outer surface of the outer circumferential member and extending laterally from respective sides of the tire, wherein the tread grooves are substantially offset relative to radially underlying ribs, and wherein each of the tread grooves has a first wall with an angle of 5° to 65° relative to the radial direction. In one embodiment, each of the tread grooves also has a second wall having a second angle of 5° to 65° relative to the radial direction.

In a fourth aspect of the present invention, there is provided a non-pneumatic tire comprising: side ribs that are staggered with respect to laterally opposing side ribs; and laterally extending tread grooves that are in substantial radial alignment with the side ribs, wherein each tread groove comprises a first wall having a first angle of 5° to 650 relative to the radial direction. In one embodiment, each of the tread grooves also has a second wall having a second angle of 5° to 65° relative to the radial direction.

In one embodiment according to any of the aspects of the present invention the ribs are angled relative to the radial direction.

In one embodiment, each of the tread grooves has a base that is substantially flat or is tapered. Also, each tread groove has a maximum surface width and each base has a maximum base width, and the maximum surface width is greater than the maximum base width. Each tread groove optionally has a maximum surface width of from 2 cm to 38 cm. Further, each of the tread grooves optionally has a maximum depth of from 1 cm to 30 cm.

In one embodiment, the angle of the each of the walls for the tread grooves may be an open angle having an absolute value of from 5° to 65°, e.g., from 10° to 45° or from 15° to 35°. Preferably, both walls have the same angle.

In one embodiment there is provided a vehicle, e.g., an OTR vehicle, comprising one or more of the non-pneumatic tires of any of the embodiments or aspects of the present invention.

BRIEF DESCRIPTION OF THE DRAWINGS

The foregoing and other objects and advantages of our invention will appear more fully from the following description, made in connection with the accompanying drawings of non-limiting preferred embodiments of the inventions, wherein like characters refer to the same or similar parts throughout the views, and in which:

FIGS. 5A-5F are detailed side views of various tread grooves constructed in accordance with one or more embodiments of the present invention;

DETAILED DESCRIPTION OF THE PREFERRED EMBODIMENTS

Figure 1A:
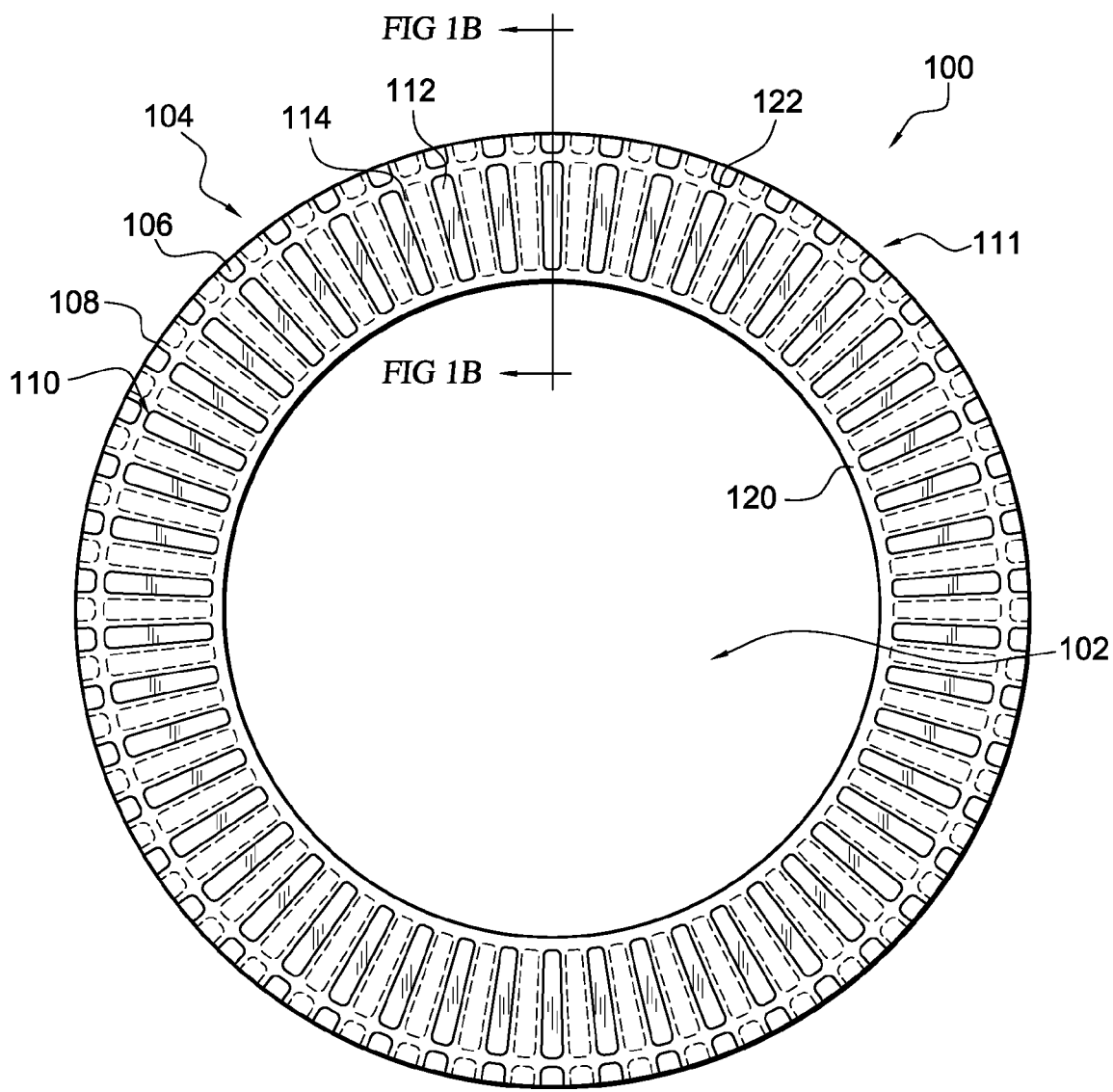
FIG. 1A is a side view of a tire constructed in accordance with one embodiment of the present invention in which laterally extending tread grooves are in substantial radial alignment with the cavities.

The embodiments of the invention are directed to tires and, more specifically, to non-pneumatic tires preferably capable of carrying extreme loads. In one embodiment, the invention relates to a non-pneumatic tire having: (a) side cavities that are staggered with respect to laterally opposing side cavities; and (b) laterally extending tread grooves that are in substantial radial alignment with the cavities and that have at least one wall that is angled relative to the radial direction. In another embodiment, the invention relates to a non-pneumatic tire having: (a) side ribs (which preferably define the above-described cavities) that are staggered with respect to laterally opposing side ribs; and (b) laterally extending tread grooves that are substantially offset relative to the ribs and that have at least one wall that is angled relative to the radial direction. In another embodiment, the invention relates to a non-pneumatic tire having: (a) side cavities that are staggered with respect to laterally opposing side cavities; and (b) laterally extending tread grooves that are in substantial radial alignment with the cavities and that have at least one wall that is angled relative to the radial direction. As used herein, the term "lateral" and variations thereof refers to the direction substantially parallel to the axis of rotation of the tire. The ribs, side cavities and/or tread grooves preferably are formed together in a molding process employing a single mold to structurally integrate the ribs, side cavities and/or tread grooves. Tires according to the invention ideally are well-suited for off-the-road (OTR) vehicles and applications and are preferably capable of individually withstanding extreme loads of, for example, greater than 5 tons, greater than 30 tons or greater than 65 tons.

In one embodiment of the invention, each of the tread grooves in the tread pattern has two walls that are substantially aligned with the radial direction of the tire. In another embodiment of the invention each of the tread grooves has one wall that is substantially aligned with the radial direction of the tire and one wall that is angled relative to the radial direction of the tire. In another more preferred embodiment, each of the tread grooves has two walls that are angled relative to the radial direction of the tire. The alignment of the groove walls, whether aligned or angled, is established at the respective tire sidewall in the region of the tread groove. When angled, each wall may have an angle relative to the radial direction of from 5° to 65°, e.g., from 10° to 45° or from 15° to 35°. At the sidewall of the tire, the angle is measured relative to the radial direction at the mid-point of the tread groove wall, i.e., the point of the wall that is equal in distance between the plane of the tread surface and plane of the tread groove base. By "angle" it is meant the absolute value of the angle. In one embodiment, the angle is an "open" angle, meaning the angle extends from the base outward and away from the opposing tread wall as shown and described below in FIGS. 4A-4D and FIGS. 5A-5F. In other words, a groove wall with an open angle will have a tread groove width at the sidewall of the tire that is wider than the width at the base of the tread groove. For example, when both walls are open angles the cross-section of the groove preferably is a substantially trapezoidal shape.

The angled tread groove walls of embodiments of the invention have improved resistance to tears caused by lodged obstructions because the angled tread groove wall inhibit such obstructions from becoming enlodged. These obstructions general include objects that are lying loosely on the ground and include, but are not limited to, debris, rocks, trees, lumber, metal scraps, load spillage, blocks of concrete, etc. Such obstructions are often found in the typical environment, e.g., mines, in which OTR vehicles are commercially operated.

According to one embodiment of the invention, circumferentially adjacent cavities in the tire are separated from one another by the ribs, which extend from a side of the tire to a central web. Like the cavities that are defined by the ribs, the ribs themselves preferably are staggered with respect to laterally opposing ribs. The ribs may be radially oriented, meaning the ribs extending in the radial direction relative to the tire's axis of rotation, or may be oriented at one or more angles relative to the radial direction. In the latter embodiment, the angle preferably is less than 60 degrees, e.g., less than 30 degrees, less than 20 degrees, less than 15 degrees, or less than 10 degrees, relative to the radial direction. In terms of ranges, the rib angle optionally is from 0 to 60 degrees, e.g., from 1 to 30 degrees, or from 5 to 25 degrees, relative to the radial direction. Generally, the smaller the angle, the greater the load the tire will be able to withstand and the longer the tire lifetime. For particularly heavy loads, the ribs preferably are radially oriented, i.e., oriented at 0 degrees relative to the radial direction. Conversely, the tires tend to exhibit greater compressibility, which may be desired, for example, for particularly rugged terrains, as the rib angle increases relative to the radial direction.

Figure 2A:
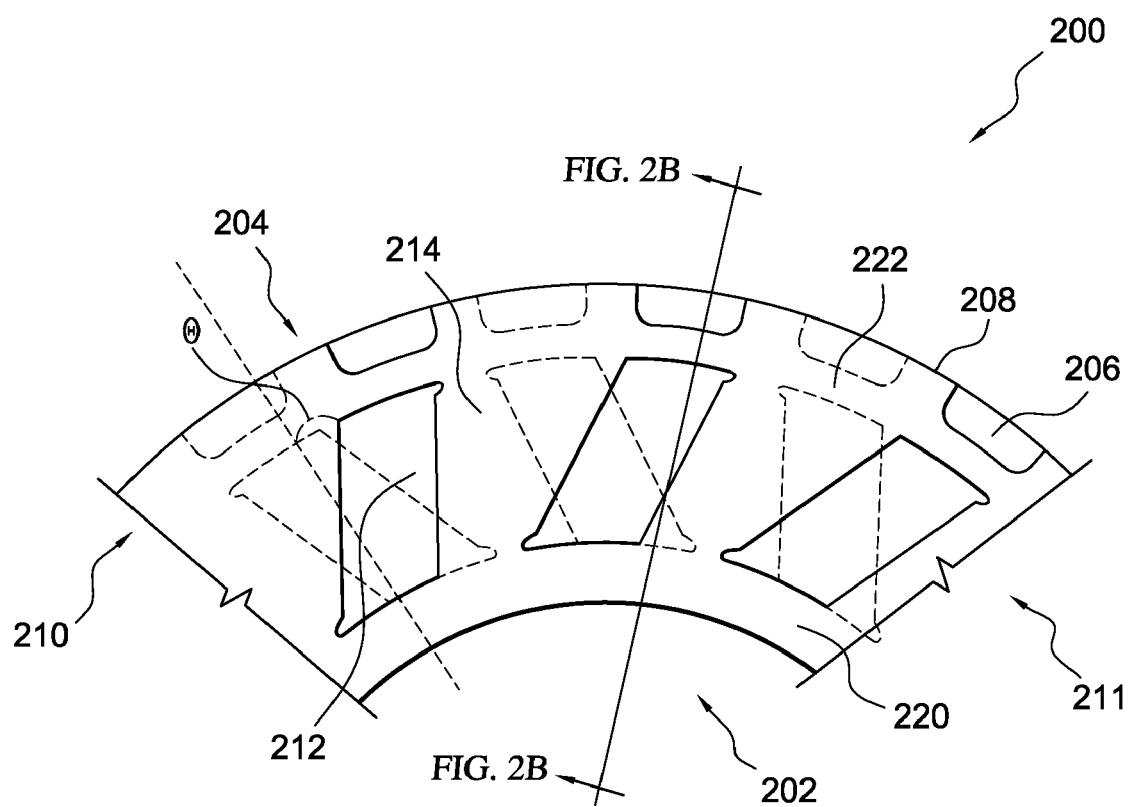
FIG. 2A is a side view of a tire having ribs and cavities that are angled relative to the radial direction in accordance with an embodiment of the present invention.

In those embodiments where the ribs are radially oriented, the cavities preferably are radially oriented as well, as shown in FIG. 1A, meaning that the cavities are substantially aligned in a radial direction. The portion of a cavity that is adjacent the inner circumferential member or hoop may be smaller than the portion of the cavity that is adjacent the outer circumferential member or hoop. In this aspect, the sidewalls of the cavity preferably are substantially aligned in the radial direction although other configurations are also possible. In those embodiments where the ribs are oriented at an angle relative to the radial direction, the cavities may similarly be oriented at an angle relative to the radial direction. In various optional embodiments, the cavities may have a substantially triangular, substantially trapezoidal, or substantially parallelogram shape, as shown in FIG. 2A.

As indicated above, the tire preferably includes a central web. The central web preferably is oriented in an imaginary plane (the "equatorial plane"), which is perpendicular to the axis of rotation (the "central axis") and centrally located relative to the sidewalls of the tire. In one aspect, the tire has an inner circumferential member or hoop and an outer circumferential member or hoop, and the central web connects the inner and outer circumferential members, as well as provides a surface upon which the ribs on adjacent sides of the central web are secured. Thus, the central web conceptually separates the ribs and cavities on one lateral side of the tire from those on the other lateral side of the tire. That is, the central web preferably separates laterally opposing side cavities and laterally opposing ribs. The presence of a central web has been shown to significantly increase tire strength and tire lifetime.

The specific form or design of the tread may vary widely. As indicated above, however, the tread preferably comprises laterally extending tread grooves that are substantially offset relative to the ribs. By being "substantially offset" relative to the ribs it is meant that the laterally extending tread grooves do not substantially overlap radially underlying ribs at the portion, e.g., wall, where the rib meets the outer circumferential member or hoop. Thus, in those embodiments where the ribs, and hence the cavities, are angled relative to the radial direction, a tread groove is considered "offset" with a radially underlying rib when the groove does not substantially overlap the radially underlying rib at the wall where the rib that meets the outer circumferential member or hoop, regardless of the location where the rib connects with the inner circumferential member or hoop.

Additionally or alternatively, the tread may comprise laterally extending tread grooves that are substantially aligned with the cavities. By "substantially aligned" with the ribs it is meant that a laterally extending tread groove is in substantial radial alignment with an underlying cavity in a region where the cavity connects with the outer circumferential member or hoop. Thus, in those embodiments where the ribs are angled relative to the radial direction, a tread groove is considered "substantially aligned" with a cavity if the groove substantially overlaps a radially underlying cavity in a region where the cavity connects with the outer circumferential member or hoop regardless of the location where that cavity connects with the inner circumferential member or hoop. Of course, the tread employed may include other tread features in addition to the aforementioned tread grooves.

Since, in one embodiment, the side cavities are staggered with respect to laterally opposing side cavities and laterally extending tread grooves are substantially offset relative to the ribs (or in substantial radial alignment with the cavities), the number of laterally extending tread grooves generally corresponds with the number of cavities (as well as the number of ribs) in the tire. In some embodiments, there may be one or more tread grooves that each align relative to the cavities. The ratio of the number of cavities to the number of tread grooves preferably ranges from 1:1 to 4:1 or from 1:1 to 2:1. Similarly, the ratio of the number of ribs to tread grooves is preferably ranges from 1:1 to 4:1 or from 1:1 to 2:1.

In this first configuration, where tread grooves are in substantial radial alignment with the cavities and offset relative to the ribs, the shear stress may be reduced. The reduction may be approximately 5% to 50%, e.g., 10% to 30%, as compared to a tire where the grooves are aligned with the ribs on the same sidewall. FEA shows a reduction of stress distribution of approximately 25% as compared to a tire having grooves that are aligned with the ribs and offset relative to the cavities.

In a second embodiment of the present invention, there is a non-pneumatic tire having: (a) side cavities that are staggered with respect to laterally opposing side cavities; and (b) laterally extending tread grooves that are substantially offset relative to the cavities and that have at least one wall that is angled with respect to the radial direction. Defined in another manner, in the second embodiment, the present invention relates to a non-pneumatic tire having: (a) side ribs (which preferably define the above-described cavities) that are staggered with respect to laterally opposing side ribs; and (b) laterally extending tread grooves that are in substantial radial alignment with the ribs and that have at least one wall that is angled with respect to the radial direction. As described above with respect to the first embodiment, the ribs and/or cavities of this embodiment may be radially oriented or angled relative to the radial direction. One advantage of the second embodiment is that the non-pneumatic tire may provide a quieter and softer ride.

Optionally, the width of each laterally extending tread groove decreases from the portion of the tread groove adjacent to the sidewall of the tire toward the axial plane, i.e., centerline, of the tire. That is, the tread grooves optionally extend laterally across the width of the tire and open towards one of the sidewalls near the shoulder of the tire. Thus, the tread grooves may take on an acute triangular form, preferably an isosceles triangular form, with the smallest angle of the triangular form pointing toward the equatorial plane of the tire. In some other aspects, the tread grooves extend across the equatorial plane of the tire, in which case the smallest angle of the triangular form may point to the opposing sidewall rather than to the equatorial plane of the tire. Employing acute triangular tread grooves may be particularly desirable for facilitating removal of the tire from its mold during the manufacturing process, described below.

As indicated above, in various embodiments, the tires of the embodiments may include a configuration having: (1) laterally extending tread grooves that are substantially offset relative to the ribs or which are in substantial radial alignment with the cavities, (2) laterally extending tread grooves that are substantially offset relative to the cavities or which are in substantial radial alignment with the ribs, or (3) a hybrid combination of both. The tread grooves of such configurations have at least one angled wall that is preferably molded into, e.g., embedded in, the outer circumferential member or hoop so as to provide traction for the tires. The tread grooves preferably extend from the sidewalls of the tire laterally toward the equatorial plane of the tire. Thus, in some aspects, the tire includes two sets of tread grooves: one set substantially oriented on a first lateral side of the equatorial plane of the tire and a second set substantially oriented on a second lateral side of the equatorial plane of the tire. It is also contemplated, as indicated above, that some or all of the tread grooves may extend (optionally slightly extend) across the equatorial plane of the tire to the other lateral side of the tire. Thus, in some embodiments, no portion of either set of tread grooves overlaps in a circumferential direction with tread grooves from the opposing set of tread grooves. In other embodiments, at least some portion of the tread grooves from one set of tread grooves overlaps in a circumferential direction with tread grooves from the second set of tread grooves, and vice versa.

As indicated above, in one embodiment, the cavities in each sidewall are substantially staggered or offset relative to cavities on the opposing sidewall. A central web preferably separates the cavities of each sidewall from the cavities on the opposing sidewall. The cavities preferably extend substantially perpendicularly relative to a plane of the sidewall from the sidewall (e.g., preferably extend in a substantially lateral direction) toward the central web, i.e., toward the axial plane. In another aspect, the cavities extend toward the central web from the sidewall at an angle relative to the lateral direction. In this latter aspect, in order to facilitate mold removal during tire manufacture, the cross-sectional area of each cavity preferably decreases in a direction from the sidewall toward the central web. In one embodiment, the substantially staggered cavities are such that the geometric centers of laterally opposing cavities on opposite sidewalls are not coincident with each other.

As indicated above, the tire has a plurality of ribs that separate cavities and extend between the inner circumferential member or hoop and the outer circumferential member or hoop. The inner hoop is preferably mountable on a rim and the outer hoop includes the tire tread (which includes the tread grooves) on the outer surface thereof. It should be understood that the inner hoop and the outer hoop comprise an unitary structure that is integrally formed from the same material.

The above-described tire configurations of the invention are particularly suited for tires having a rim with a diameter of at least 80 inches (203 cm), e.g., at least 110 inches (279 cm), or at least 140 inches (356 cm), such as tires used for off-the-road (OTR) vehicles, although the tires may also be employed on rims with smaller diameters. In the embodiment where the ribs are staggered with respect to laterally opposing ribs and the opposing side cavities are separated by a central web there is a beneficial relationship between the ribs and the central web. The synergy between the cavities, ribs and grooves increases the buckling deflection, thus allowing the part of the tire to deflect more and carry more load than would otherwise be expected. In some embodiments, the tires of the invention may be capable of supporting OTR vehicles with operational weights as high as 380 to 460 tons. An additional benefit is that the increased tire strength may allow for a reduction in the amount of tire material for a given load, which reduces the tire weight and maximizes material efficiency. Further, the improved strength in the tires of the present invention preferably provides increased tire lifetime relative to conventional pneumatic and non-pneumatic tires. In one embodiment the width of the central web is less than the width of each rib.

Tires of the present invention preferably are non-pneumatic, meaning that the tires are made of a solid material that does not require inflation to be operational. Non-pneumatic tires do not have the risks associated with tire failures, blow-outs, or punctures associated with pneumatic tires. An additional benefit of non-pneumatic tires is that even in the event of a tire failure, the tire may be driven on so that the vehicle, e.g., OTR vehicle, can be moved to a maintenance facility without requiring expensive or time-consuming towing.

Suitable materials for non-pneumatic tires include elastomeric materials, such as those described in U.S. Pat. Nos. 4,832,098, 4,934,425, 4,921,029, 4,784,201, 5,605,657, and U.S. application Ser. No. 09/919,994, filed on Aug. 2, 2001, the entire contents and disclosure of which are hereby incorporated by reference. One exemplary material may be a polyurethane elastomer comprising a prepolymer formed from a diisocyanate, e.g., diphenylmethane diisocyanate (MDI), toluene diisocyanate (TDI), para-phenylene diisocyanate (PPDI), 1,6-hexane diisocyanate (HDI), isophorone diisocyanate (IPDI), 3,3'-bitoluene diisocyanate (TODI), 1,4-cyclohexyl diisocyanate (CHDI), naphthalene-1,5-diisocyanate (NDI), methylene bis (p-cyclohexyl isocyanate) ($H_{12}$MDI), etc., and a polyol, e.g. polycaprolactone, polyester, poly(adipate) glycol, poly(hexamethylene adipate) glycol, poly(ethylene adipate) glycol, poly(diethylene adipate) glycol, poly (ethylene/propylene adipate) glycol, poly(oxypropylene)-poly(oxyethylene) glycol, poly(trimethylolpropane/hexamethylene adipate) glycol, poly(ethylene/butylene adipate) glycol, poly(butylene adipate) glycol, poly(hexamethylene/neopentyl adipate) glycol, poly(butylene/hexamethylene adipate) glycol (PBHAG), poly(neopentyl adipate) glycol, poly(tetramethylene ether) glycol (PTMEG), polyether, polyalkyleneether polyols, etc., that is cured with a polyol or diamine curative such as 4,4'-methylene-bis(2-chloroaniline) (MBCA); 4,4'-methylene-bis(3-chloro-2,6-diethylaniline) (MCDEA); diethyl toluene diamine (DETDA; Ethacure™ 100 from Albemarle Corporation); tertiary butyl toluene diamine (TBTDA); dimethylthio-toluene diamine (Ethacure™ 300 from Albemarle Corporation); trimethylene glycol di-p-amino-benzoate (Vibracure™ A157 from Chemtura Company, Inc. or Versalink™ 740M from Air Products and Chemicals); methylene bis(orthochloroaniline) (MOCA), methylene bis(diethylanaline) (MDEA); methylenedianiline (MDA); MDA-sodium chloride complex (Caytur™ 21 and 31 from Chemtura Company); isobutyl 3,5-diamino-4-chlorobenzoate (Baytec™ 1604 from Bayer MaterialScience), ethylene glycol, diethylene glycol, dipropylene glycol, neopentyl glycol, 1,3-butanediol, 1,4-butanediol, hydroquinone-bis-hydroxyethyl ether (HQEE), cyclohexyldimethanol (CHDM), etc. Preferably the prepolymer mixture has a low free diisocyanate content from 0.1 wt % to 7.0 wt %, e.g., from 1.0 wt % to 5.0 wt % or 2.5 to 3.5 wt %, based on the total weight of the prepolymer mixture. Exemplary elastomeric materials suitable for non-pneumatic tires include polyurethanes such as those formed from commercially available Adiprene™ polyurethane prepolymers and Caytur™ diamine curatives from Chemtura Corp., a segmented copolyester such as Hytrel 5556 from DuPont, a reaction injection molded material, and a block copolymer of nylon such as Nyrim from Monsanto Chemical Co. In this disclosure, polyurethane refers to a polymer with urethane linkages (derived from an isocyanate group and a hydroxyl group) and optionally, a polymer with urea linkages as well (derived from an isocyanate group and an amine group). Examples of such polyurethane elastomers are disclosed in U.S. Pat. Nos. 5,077,371, 5,703,193, and 6,723,771, and U.S. application Ser. No. 11/702,787, filed on Feb. 5, 2007, the entire contents and disclosure of which are hereby incorporated by reference.

In one preferred embodiment, the elastomeric material comprises a temperature de-blocked polyurethane elastomer. Such polyurethane elastomers may comprise a mixture of a polyurethane prepolymer formed from a polyol, e.g., polycaprolactone, polyester, poly(tetramethylene ether) glycol (PTMEG), etc., and a diphenylmethane diisocyanate (MDI) preferably having a low free MDI content from 0.1% to 7.0%, e.g., from 1.0% to 5.0% based on the total weight of the prepolymer mixture, and a curative having a low free methylenedianiline (MDA) content from 0.05% to 2.0%, e.g., from 0.1% to 1.0% based on the total weight of the curative. Such preferred polyurethane systems are disclosed in US Publication No. 2003/0065124, the entirety of which is incorporated herein by reference. A suitable low free MDI polyurethane prepolymer includes ADIPRENE™ LFM 2450, ADIPRENE™ LFM 2400, ADIPRENE™ LFM 1250, ADIPRENE™ LFM 500, and Vibrathane™ 8030 each made by Chemtura Corporation. A suitable low free MDA curative includes Caytur™ 21, Caytur™ 21-DA, Caytur™ 31, Caytur™ 31-DA each made by Chemtura Corporation.

Preferably, the elastomeric material is the reaction product of an isocyanate, a polyol, and a curative, and not a blowing agent, e.g., the elastomeric material is a non-foamed polyurethane material.

Also in one embodiment, the tire is formed exclusively of elastomeric materials described above and lacks an internal metal component, such as a metal band, metal wire, or metal reinforcement, and/or lacks a rubber component, such as a rubber tread.

Non-limiting FIGS. 1A, 1B, 1C and 1D illustrate a tire according to one embodiment of the invention. As shown, cavities 112 extend in a radial direction from the center axis of exemplary tire 100. Tire 100 is mountable to a rim, not shown, which would be in central region 102.

In embodiments of the present invention, tire 100 is preferably removably mountable to a rim in central region 102. In one embodiment, tire 100 is molded onto or adhered with an adhesive or bonding agent to a mounting ring, e.g., a metal mounting ring, which may slideably engage the rim. Suitable mounting rings include those described in co-pending U.S. Ser. No. 12/036,951, entitled "Tire and Tire Rim Assembly," filed on Feb. 25, 2008, the entire contents and disclosure of which is hereby incorporated by reference. In one embodiment, tire 100 is molded onto or adhered to the rim, without using a mounting ring. In another embodiment, tire 100 is pressed onto the rim which creates an interference fit when mounted such that the friction between the tire and rim holds the tire in place. In one embodiment, the interference fit may be created by heating the rim and band using torches or gas ovens and assembling into position while in their hot, expanded, freely sliding state. While cooling both parts are contracted back to their former size, except for the compression that results from the rim interfering with the band. In another embodiment, the band of the tire is pressed on to the rim using a press or jack to create the interference fit. It should be understood to those skilled in the art that tire 100 may be mounted to rim using a variety of other methods without departing from the scope of the present invention.

Tire 100 comprises a tread pattern 104 having a plurality of tread grooves 106 and tread footprints 108 in a first configuration as discussed above. It should be understood that in other embodiments, tire 100 may comprise the second or third configurations as discussed above. Tread footprint 108 is the portion of tread pattern 104 that is in contact with the ground or other similar surface. It should be readily understood that tire pattern 104 is continuous around the outer circumference of tire 100, although the opposite sides of tire 100 preferably include separate sets of tread grooves, which are substantially offset with respect to one another, as described above. Tire 100 also comprises two sidewalls 110, 111, each having a plurality of staggered cavities 112 separated by ribs 114. Cavities 112 extend from a plane perpendicular to sidewalls 110, 111 towards equatorial plane or centerline 116. Oriented about equatorial plane 116 is central web 118. Cavities 112 are separated from the rim region 102 by inner circumferential member or hoop 120 and from tread pattern 104 by outer circumferential member or hoop 122. Cavities 112, ribs 114, central web 118 and tread grooves 106 are molded in the same mold and are structurally integrated. Tire 100 lacks a metal band or reinforcement member.

As shown, each tread groove 106 extends laterally across a portion of the width of tire 100 and has an opening 128 near the shoulder region of where tread pattern 104 adjoins each sidewall 110, 111. In the first configuration, tread grooves 106 are substantially offset relative to the ribs 114, but are in substantial radial alignment with, e.g., radially overlap, cavities 112 that are on the same sidewall 110 thereof. Tread grooves 106 alternate along tread pattern 104 as shown in FIG. 1C. As shown, tread grooves 106 extend in from the shoulder of tire 100 without bending or angling relative to the lateral direction as shown in FIG. 1C.

As shown in FIG. 1A, cavities 112 and ribs 114 extend in a radial direction from a center axis of tire 100. As used herein radially or radial refers to being in line with a direction that extends from the center axis of tire 100. As shown, radial cavities 112 have a substantially oval or trapezoidal shape with the distance between ribs 114 closest to rim 102 is less than the distance between the same ribs 114 closest to tread pattern 104 although other geometries may employed, as discussed above.

Figure 1B:
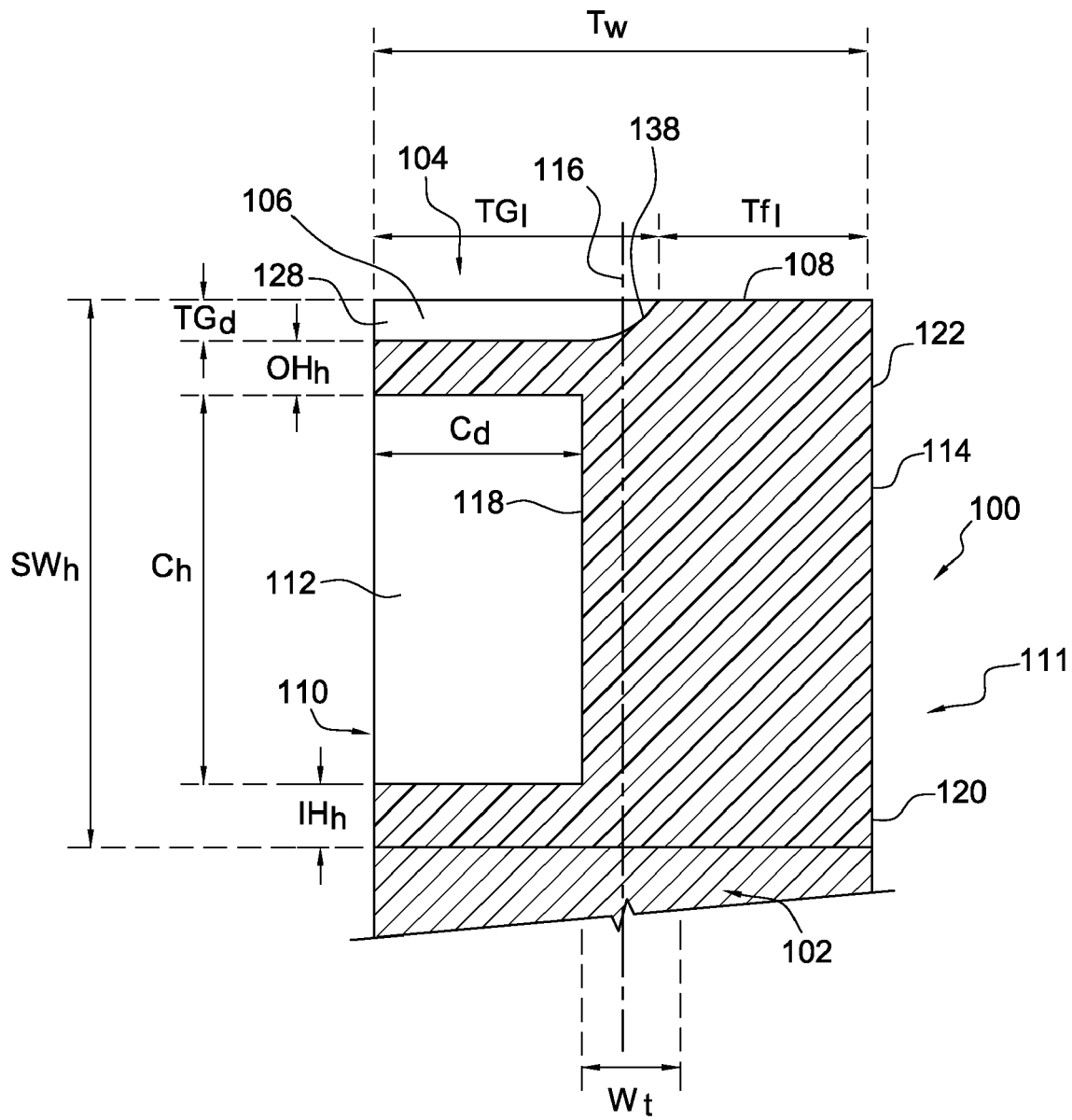
FIG. 1B is a cross-sectional view of the tire in FIG. 1A.
Figure 1C:
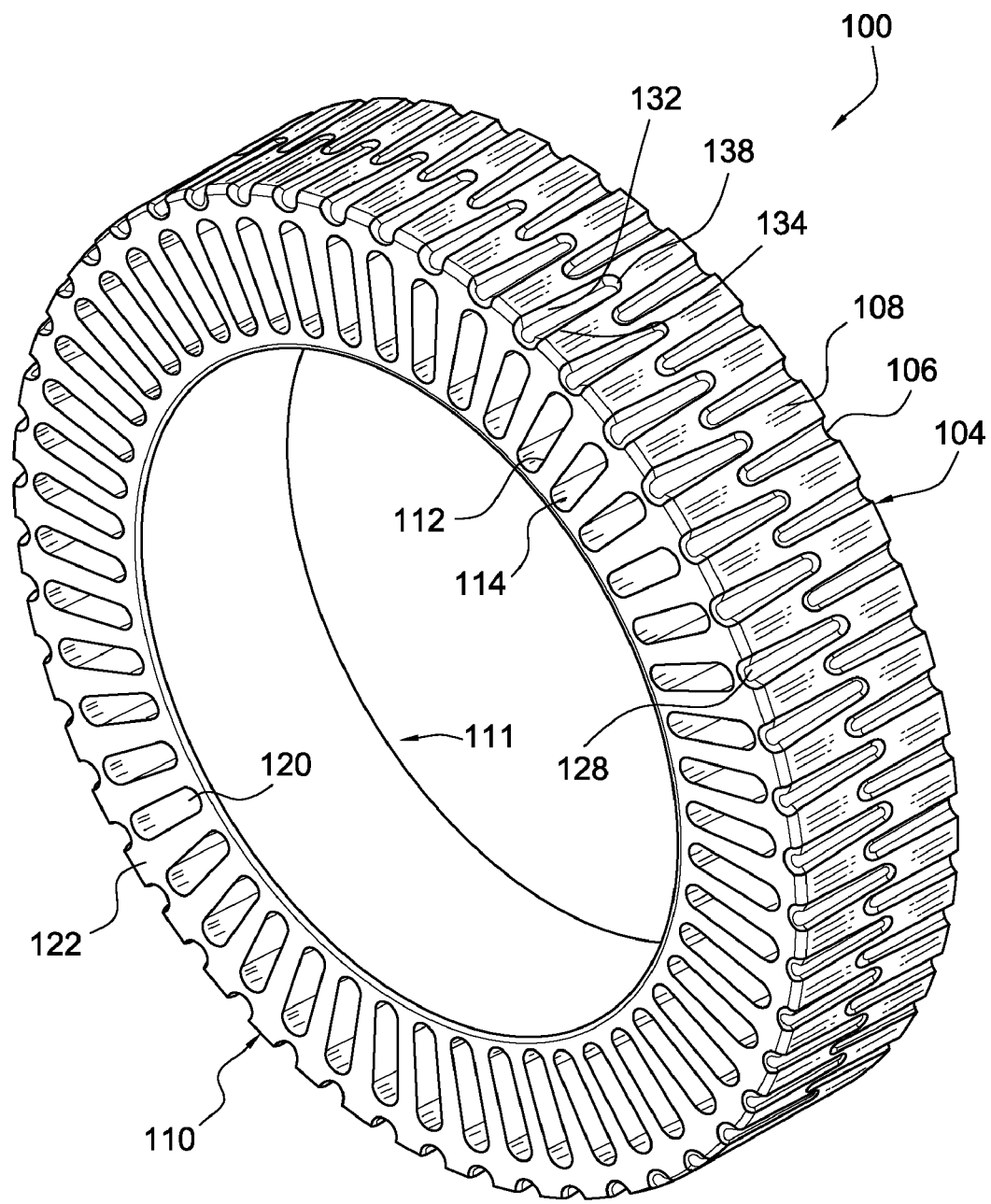
FIG. 1C is a perspective view of the tire in FIG. 1A.

In the embodiment shown in FIG. 1B, each cavity 112 is defined by the inner circumferential member or hoop 120, an outer circumferential member or hoop 122 and adjacent ribs 114. As shown, staggered cavities 112 extend inward perpendicularly from a plane of sidewall 110 with substantially straight walls such that the open area of cavity 112 is approximate to the area of the cavity on web 118. In other embodiments, the walls of the cavities may be angled or designed with a draft, in which case the cross-sectional area of rib at the sidewall would be less than the cross sectional area of rib where it meets the central web. This latter embodiment may be desirable to facilitate removal of the tire from the mold during manufacturing as discussed above.

The staggered cavities 112 on sidewalls 110, 111 extend into tire 100 towards central web 118. On sidewall 111, cavities 112 are staggered or offset relative to cavities 112 on the other side of the central web 118, such that ribs 114 on sidewall 110 laterally align with cavities 112 on opposing sidewall 111, and vice versa. Such staggering of cavities 112 reduces the amount of material used in the mold when making a tire of the present invention while maintaining desirable strength, durability and lifetime characteristics for the tire. The configuration of cavities 112, ribs 114, and grooves 106 act together to strengthen central web 118 and the overall tire 100.

Figure 1D:
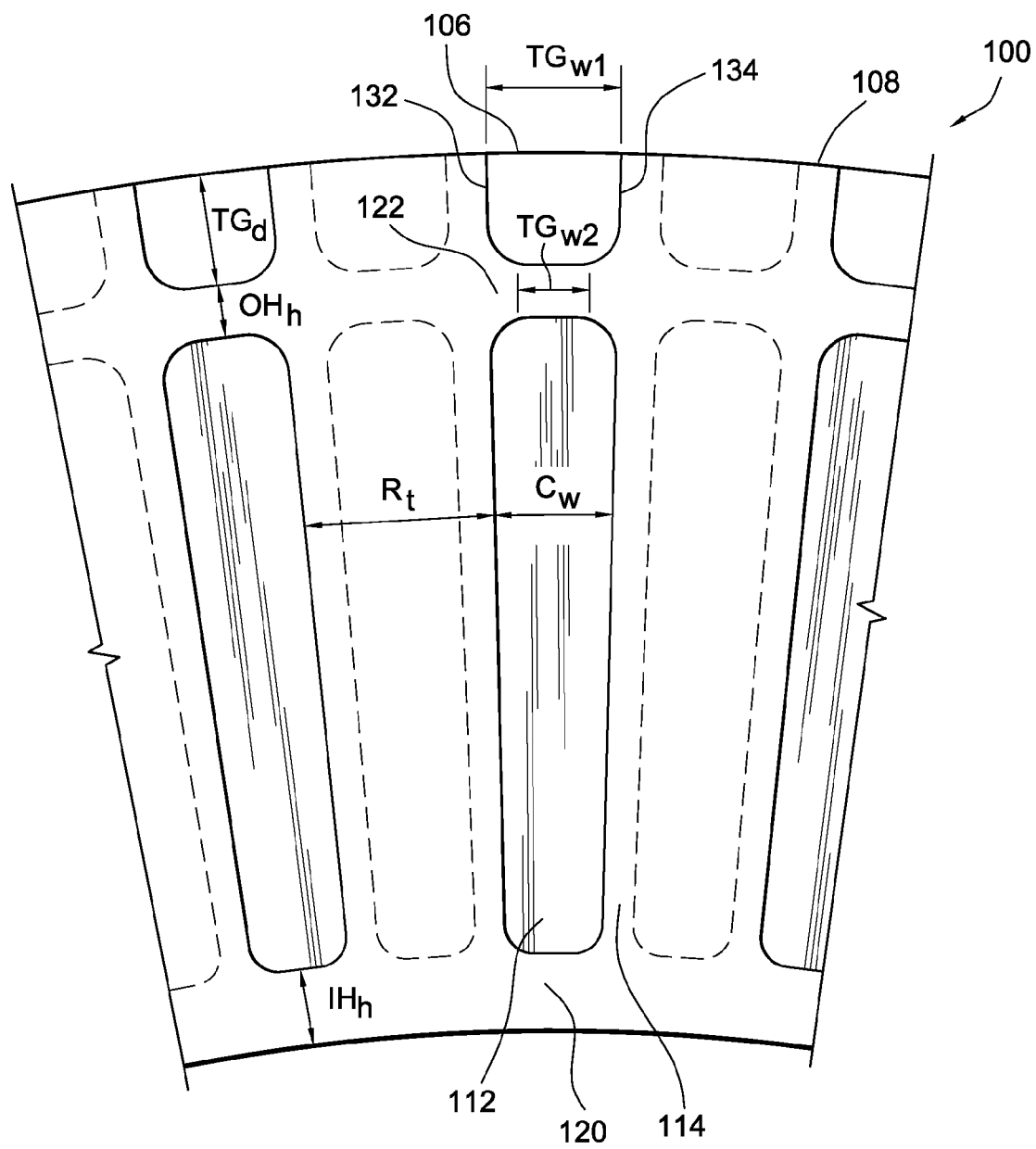
FIG. 1D is a detailed side view of the tire sidewall shown in FIG. 1A.

FIG. 1D is a detailed side view of tire 100 having tread grooves 106. Tread grooves 106 comprise a base 130, first wall 132 and second wall 134. The first and second walls are used for convenience throughout this specification to distinguish the walls of groove 106. First wall 132 and second wall 134 are joined by a closed wall 138, shown in FIGS. 1B and 1C. As shown in FIG. 1D, first wall 132 and second wall 134 are aligned in a radial direction and are not substantially angled with respect to the radial direction. In such embodiments, when base 130 is parallel to the ground, first wall 132 and second wall 134 are substantially perpendicular to the ground. In other words, first wall 132 and second wall 134 are substantially straight and are substantially parallel to each other, i.e., U-shaped.

In the embodiment of FIGS. 1A-1D, cavities 112 and tread grooves 106 are radially aligned relative to each other and create a pattern as follows. On one sidewall 110, ribs 114 are in substantial radial alignment with corresponding footprints 108, while on the opposing sidewall 111 a cavity 112 is in substantial radial alignment with tread groove 106. This alternating pattern between tread pattern 104 and sidewalls 110, 111 repeats for the entire circumference of tire 100.

The number of cavities 112, ribs 114 and grooves 106 may vary depending on the configuration of tire 100. The tire may have, for example, from 10 to 80 cavities, or more preferably from 25 to 60 cavities on each sidewall (twice as many in the overall tire). The tire may similarly have, for example, from 10 to 80 ribs, or more preferably from 25 to 60 ribs on each sidewall (twice as many in the overall tire). The tire optionally may also have from 0 to 320 tread grooves, or more preferably 40 to 120 tread grooves on each side of the tire (twice as many in the overall tire). Embodiments with zero grooves may be referred to as slick tires which lack a tread pattern. In one embodiment, tire has the same number of cavities, ribs and grooves. In another embodiment, for every groove there is a corresponding cavity, and a rib separates each cavity.

The dimensions of tire 100 may be affected by various design parameters such as ground pressure (traction), vertical spring rate (ride), cornering power (handling), total deflection, material volume, and tire weight. As shown by FIGS. 1B and 1D tire 100 of the present invention may have the dimensions provided in Table 1.

TABLE 1

Dimensions of Tire

| Item | Description | General Range | Preferred Range | Most Preferred Range |
|---|---|---|---|---|
| $T_w$ | Tire Width | 13-178 cm (5-70 inches) | 51-150 cm (20-59 inches) | 66-74 cm (26 to 29 inches) |
| $SW_h$ | Sidewall Height | 5-279 cm (2-110 inches) | 13-203 cm (5-80 inches) | 38-127 cm (15-50 inches) |
| $C_d$ | Cavity Depth | 13-76 cm (5-30 inches) | 20-38 cm (8-15 inches) | 25-33 cm (10-13 inches) |
| $C_h$ | Cavity Height | 13-295 cm (5-116 inches) | 20-76 cm (8-30 inches) | 25-64 cm (10-25 inches) |
| $C_w$ | Cavity Width | 2-38 cm (1-15 inches) | 5-33 cm (2-13 inches) | 5-20 cm (2-8 inches) |
| $W_t$ | Web Thickness | 1-51 cm (0.5-20 inches) | 2-20 cm (1-8 inches) | 4-10 cm (1.5-4 inches) |
| $IH_h$ | Inner Hoop Height | 1-102 cm (0.5-40 inches) | 2-20 cm (1-8 inches) | 5-10 cm (2-4 inches) |
| $OH_h$ | Outer Hoop Height | 1-102 cm (0.5-40 inches) | 2-25 cm (1-10 inches) | 5-20 cm (2-8 inches) |
| $TG_d$ | Tread Groove Depth | 1-30 cm (0.25-12 inches) | 5-20 cm (2-8 inches) | 6-15 cm (2.5-6 inches) |
| $TG_l$ | Tread Groove Length | 1-76 cm (0.25-30 inches) | 2-64 cm (1-25 inches) | 10-51 cm (4-20 inches) |
| $TF_l$ | Tread Footprint Length | 1-102 cm (0.25-40 inches) | 2-76 cm (1-30 inches) | 10-51 cm (4-20 inches) |
| $TG_{w1}$ | Tread Groove Width (at tread surface) | 2-38 cm (1-15 inches) | 8-33 cm (3-13 inches) | 10-20 cm (4-8 inches) |
| $TG_{w2}$ | Tread Groove Width (at tread base) | 0.5-32 cm (0.2-12.5 inches) | 2-25 cm (0.8-10 inches) | 4-20 cm (1.6-8 inches) |
| $R_t$ | Rib Thickness | 2-38 cm (1-15 inches) | 5-33 cm (2-13 inches) | 10-20 cm (4-8 inches) |

For some dimensions, the ranges above represent a maximum, such as the $C_w$ and $R_t$, because cavities 112 and ribs 114 may narrow from outer hoop 122 to inner hoop 120. Also $TG_{w1}$ and $TG_{w2}$ may narrow as tread groove 104 approaches closed wall 138. Further, $TG_d$ may decrease as tread groove 104 approaches closed wall 138. It should be understood that $SW_h$ may be equal to $C_h + IH_h + OH_h + TG_d$, and $T_w$ may be equal to $2(C_d) + W_t$ or $TG_l + TF_l$.

In one embodiment, $OH_h$ is from 1.5-6 times larger, e.g., from 2-4 times larger or from 2.5-3.5 times larger, than $IH_h$. In still another embodiment, $OH_h + TG_d$ is from 1.5-6 times larger, e.g., from 2-4 times larger or from 2.5-3.5 times larger, than $IH_h$. In such embodiments, the tires will have a thicker portion of the tread near the tread than near the rim, which may increase the operational lifetime of the tire. This allows for the wearing of the tread portion of the tire without wearing the cavity/rib portion of the tire.

In addition to the dimensions represented in Table 1, tire 100 has an outer diameter that may range from 25 inches (64 cm) to 190 inches (483 cm), e.g., from 60 inches (152 cm) to 159 inches (404 cm) or from 63 inches (160 cm) to 100 inches (254 cm). An inner diameter that may range from 20 inches (51 cm) to 140 inches (356 cm), e.g., from 30 inches (76 cm) to 110 inches (279 cm) or from 40 inches (102 cm) to 80 inches (203 cm). It should be understood that when the tires of various embodiments of the present invention used on the same vehicle have similar dimensions.

Figure 2B:
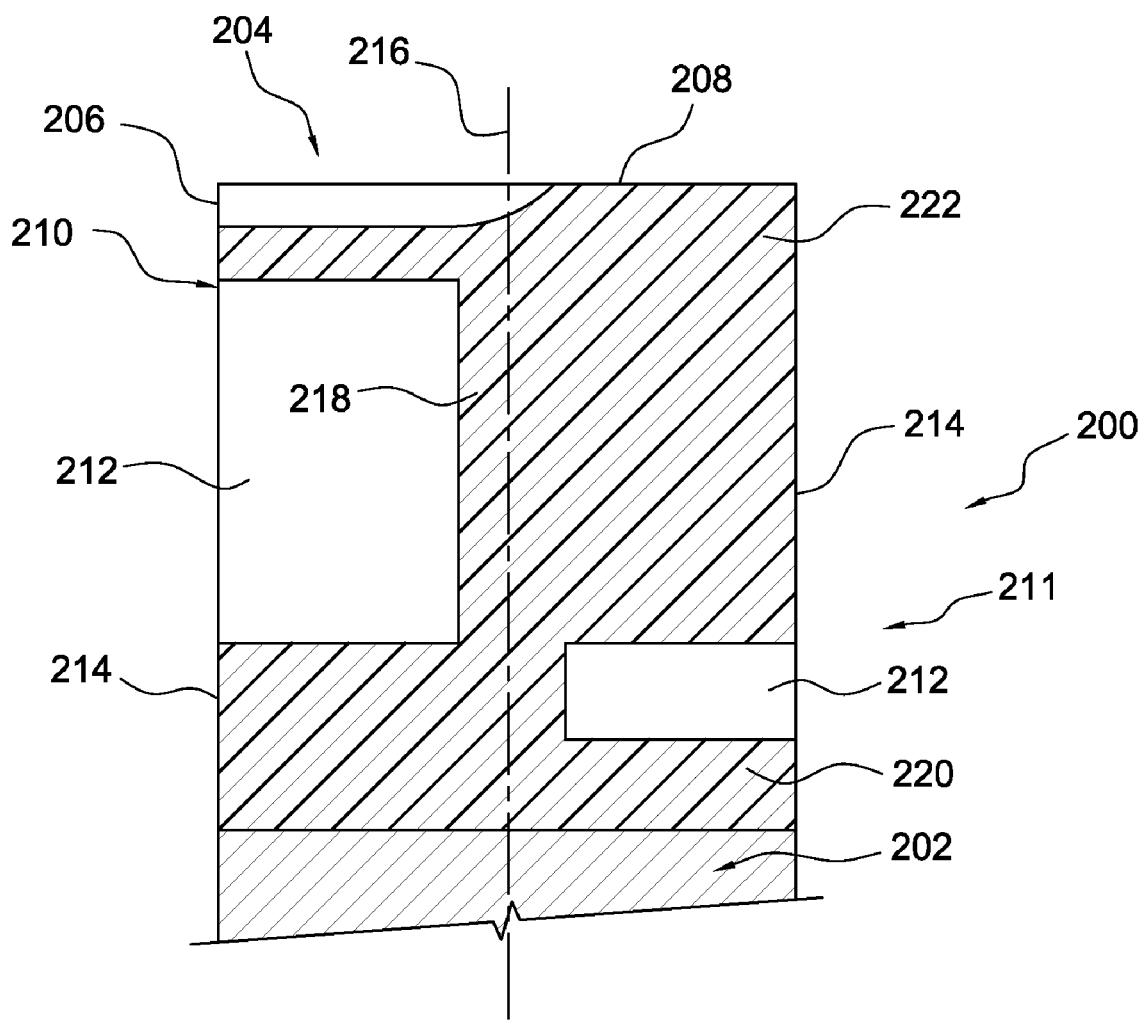
FIG. 2B is a cross-sectional view of the tire in FIG. 2A.

In another embodiment of the present invention, the staggered cavities are angled relative to the radial direction as shown in exemplary tire 200 of FIGS. 2A and 2B. Similar to FIGS. 1A-1D, tire 200 comprises a rim 202 (not shown), tread pattern 204, tread grooves 206, tread footprints 208, sidewalls 210, 211, cavities 212, ribs 214, web 218, inner circumferential member or hoop 220 and outer circumferential member or hoop 222. Web 218 extends along a equatorial plane or centerline 216 of tire 200 and separates cavities 212 on each sidewall 210, 211. Unlike cavities 112 in FIGS. 1A-1D, cavities 212 in FIGS. 2A and 2B are offset from the radial direction by angle .theta., as described above. Changing angle .theta. with respect to the radial direction effectively varies the spring rate of tire 200.

In FIG. 2A cavities 212 on each sidewall 210, 211 are positioned in the opposite offset direction as shown in U.S. Pat. Nos. 4,832,098, 4,934,425, 4,921,029, and 4,784,201, the entire contents and disclosure of which are hereby incorporated by reference.

As discussed above, for purposes of the present specification, ribs 214 that are angled relative to the radial direction are considered to be in substantial radial alignment with tread grooves 206 if the ribs are radially aligned with tread grooves at the position where the ribs adjoin outer circumferential member 222. As shown, at the position where rib 214 adjoins outer circumferential member or hoop 222, there is a tread groove 206, and ribs 214 of tire 200 are considered to be in substantial radial alignment with tread grooves 206. On the opposing sidewall 211 at this position, rib 214 would be laterally aligned with an opposing cavity 212. Conversely, on opposing sidewall 211, cavity 212 would be aligned relative to groove where cavity 212 adjoins outer circumferential member of hoop 222. This configuration repeats throughout the circumference of the tire. In another aspect, not shown, the angled ribs may be substantially offset relative to the tread grooves (e.g., the cavities may be in substantial radial alignment with the tread grooves).

In one embodiment, the tire is solid and has a unitary, i.e., integral, structure that comprises a tire and tread formed together and made of the same composition. A unitary structure is configured so that the web and rib structures provide a load-carrying structure with substantially uniform deformation due to compression of the tire as the tire rotates during operation. The thickness of the web, the ribs and the hoops are such that there is substantially no sidewall bulge of the tire during operation. In addition, the tire may deform without buckling, due to compression during normal operation, but the tire is configured to allow the ribs to buckle, either individually or severally, when the tire runs over a projection on the ground. The word "buckle" as used herein is defined as a relatively sudden and radical deformation as a result of compression loading that exceeds a certain critical load value. In addition, the tires of the present invention, particularly those having radially oriented ribs, tend to exhibit improved envelopment of road hazards relative to conventional solid non-pneumatic tires due to this buckling behavior resulting in reduced impact forces on the vehicle. However, for some operating environments, such as mines, the buckling of the tire is not enough to inhibit obstructions from becoming lodged in tire. Once an obstruction is enlodged, the obstruction may tear or destroy the tire, thus reducing the operational lifetime of the tire. To overcome this problem, the present invention, in addition to the buckling nature of the tire, provides for angled tread groove walls as described throughout this specification.

The ability of tires configured in accordance with some embodiments of the present invention to be deformed yet return to its cylindrical shape substantially instantaneously under compression and sudden transitions of loading requires that the tires withstand a maximum strain of from 10% to 30%, e.g., from 15% to 20%, during normal operation yet buckle locally to absorb the sudden impact of a projecting object, or ground surface irregularity. It is this unexpected ability, derived from its unique construction from the elastomer, which gives such tires the handling and ride characteristics suitable for OTR vehicles.

Figure 3A:
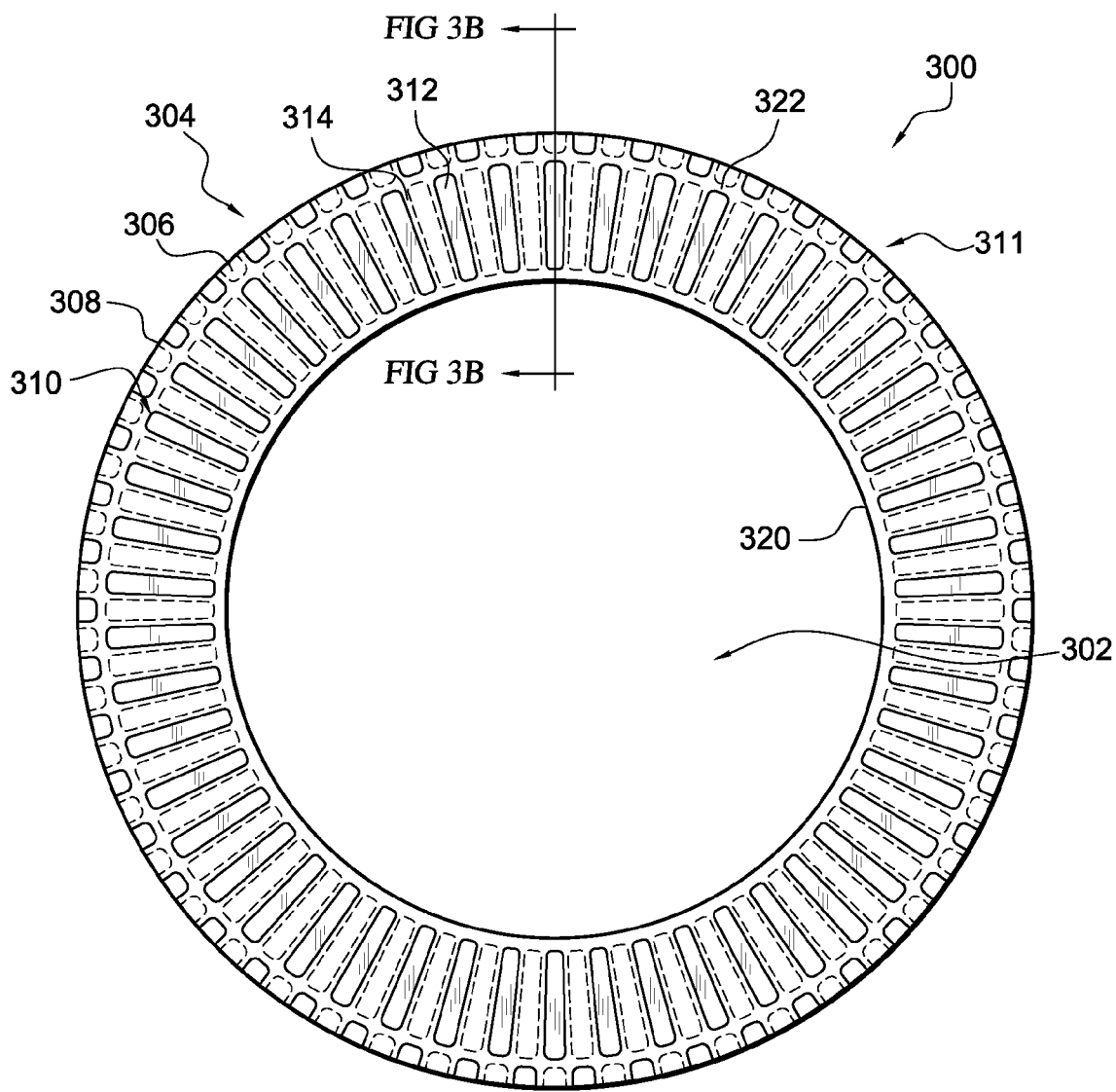
FIG. 3A is a side view of a tire having laterally extending tread grooves that are in substantial radial alignment with the ribs in accordance with an embodiment of the present invention.
Figure 3B:
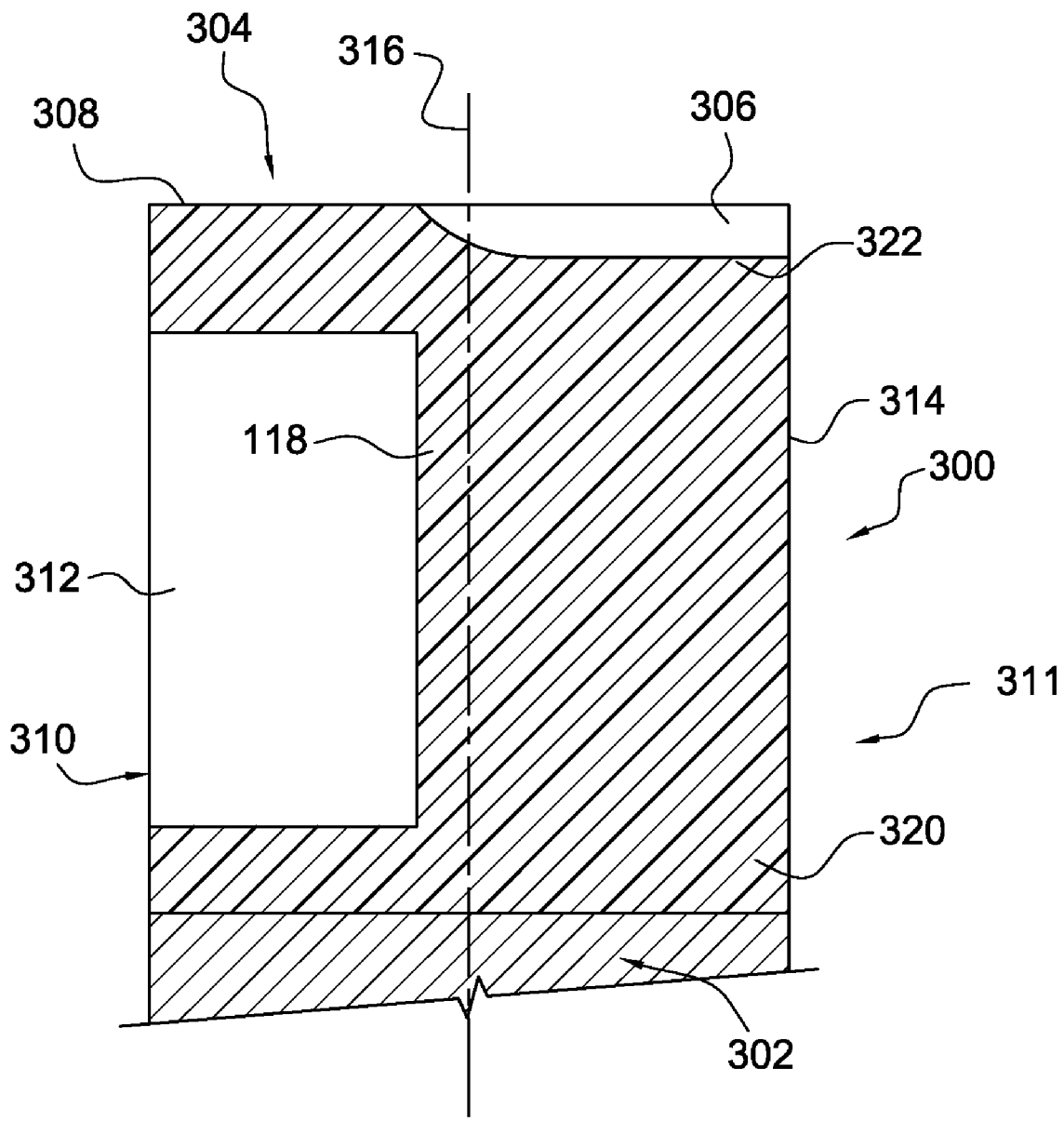
FIG. 3B is a cross-sectional view the tire in FIG. 3A.

Non-limiting FIGS. 3A and 3B illustrate an exemplary tire according to the second embodiment of the present invention. Tire 300 comprises a central region 302, tread pattern 304, tread grooves 306, tread footprints 308, sidewalls 310, 311, cavities 312, ribs 314, central web 318 oriented about equatorial plane or centerline 316, inner circumferential member or hoop 320, and outer circumferential member or hoop 322. Cavities 312 and tread grooves 306 are radially offset relative to each other in the second configuration and create a pattern as follows. On one sidewall 310, ribs 314 are in substantial radial alignment with corresponding grooves 306, while on the opposing sidewall 311, cavity 312 is in substantial radial alignment with tread footprints 308. This alternating pattern between tread pattern 304 and sidewalls 310, 311 repeats for the entire circumference of tire 300. As shown, cavities 312 extend in a radial direction from the center axis of exemplary tire 300 similar to FIG. 1A.

In another aspect of the present invention, there is provided a tread groove 406 having an angled first wall 432 and angled second wall 434 as shown in FIGS. 4A-4D. Tire 400 comprises a central region 402, tread pattern 404, tread grooves 406, tread footprints 408, sidewalls 410, 411, cavities 412, ribs 414, central web 418 oriented about equatorial plane or centerline 416, inner circumferential member or hoop 420, and outer circumferential member or hoop 422. Tread grooves 404 have an opening 428 toward the respective sidewall 410 and have a base 430, first wall 432, second wall 434, and closed wall 438.

As shown in FIGS. 4A-4D, the angles of each wall 432 and 434 are open angles that extend outward from tread groove base 430. Further, walls 432 and 434 are rounded at the portion of the wall that adjoins the tread surface and base. Also in FIG. 4D, tread groove 406 also comprises a lip 440 that is a smooth, rounded region connecting sidewall 410 to tread groove 406. In one embodiment, either first wall 432, second wall 434, closed wall 438, or all walls have a smooth, rounded region connecting tread footprint 408 with tread groove 406.

Tire 400 in FIGS. 4A-4D is shown having the same groove 406/cavity 412 alignment as in FIGS. 1A-1D. However, unlike FIGS. 1A-1D the tread grooves 406 have walls 432 and 434 that are substantially non-parallel with respect to each other and are angled relative to radial direction 450 as shown by $\sigma_1$ and $\sigma_2$ in FIG. 4D. In one embodiment, $\sigma_1$ is an open angle from 5° to 65°, e.g., from 10° to 45° or from 15° to 35°. In one embodiment, $\sigma_2$ is an open angle from 5° to 65°, e.g., from 10° to 45° or from 15° to 35°. In another embodiment the absolute value of the open angles of $\sigma_1$ and $\sigma_2$ are approximately equal and more preferably $\sigma_1$ and $\sigma_2$ are both about 15° from the radial direction. As stated above, the angle is measured from the mid-point of the groove wall and is established at the sidewall of the tire. In embodiments having angled walls, when base 430 is parallel to the ground, first wall 432 and second wall 434 are substantially non-perpendicular to the ground, i.e., V-shaped.

In one embodiment base 430 is substantially flat, e.g., the tread groove depth does not change by more than 7%, e.g., by more than 5% or by more than 3%, from sidewall 410 toward the bottom of closed wall 438. Also the width of base 430 narrows from sidewall 410 towards closed wall 438, and base 430 may have a substantially triangular shape. In an alternative embodiment, shown in FIG. 4E, base 430 is tapered from the bottom of closed wall 438 above web 418 to opening 428 on sidewall 410. In such alternative embodiments, the difference in depth between where closed wall 438 meet base 430 and where base 430 meets sidewall 410 is at least 2.5 cm (1 inch), e.g. at least 5 cm (2 inches) or at least 7.5 cm (3 inches). For example, the depth of base 430 may be 7.5 cm (3 inches) at sidewall 410 and 5 cm (2 inches) at the bottom of closed wall 438.

Figure 4A:
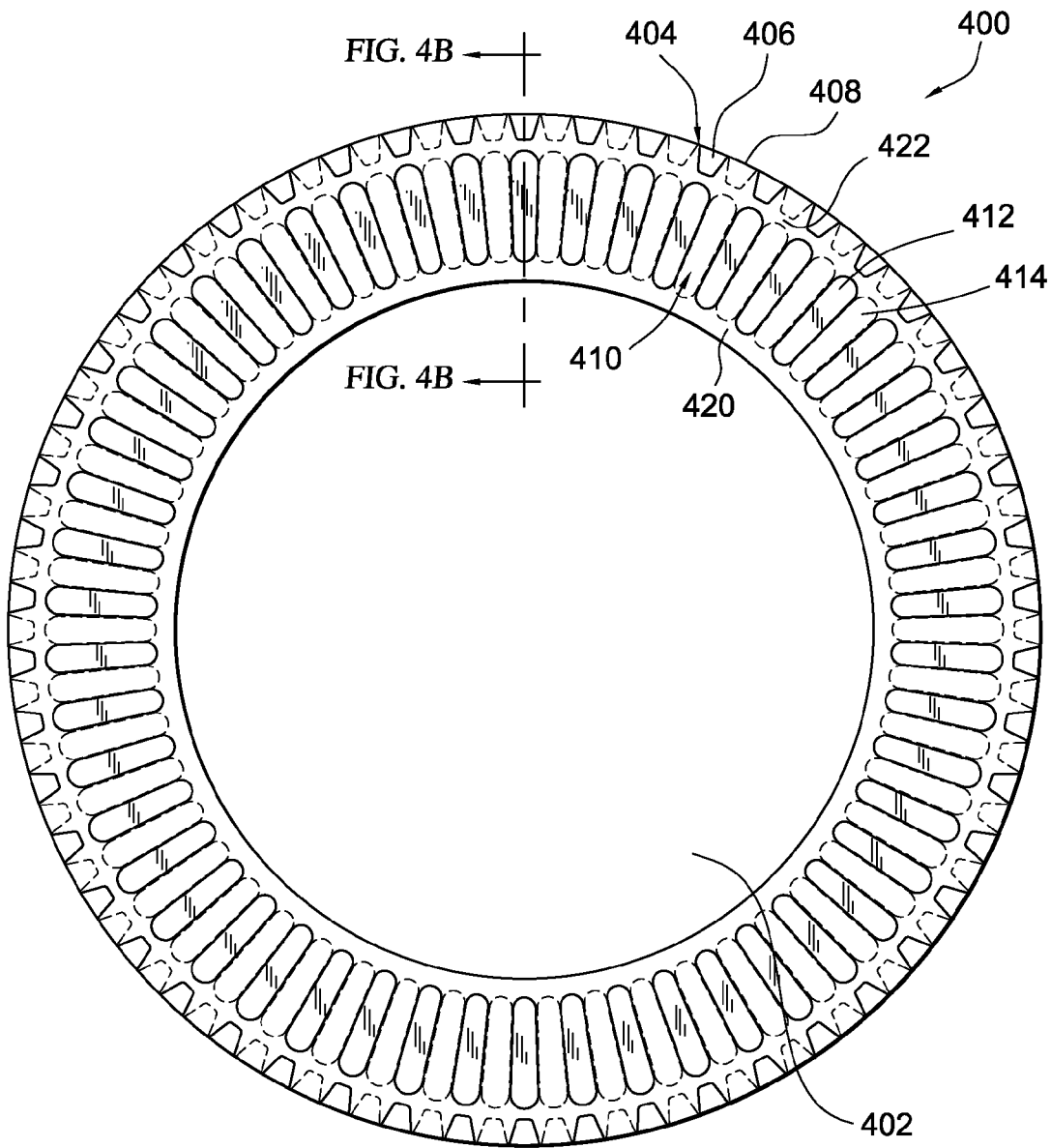
FIG. 4A is a side view of a tire having angled tread grooves constructed in accordance with one embodiment of the present invention.
Figure 4B:
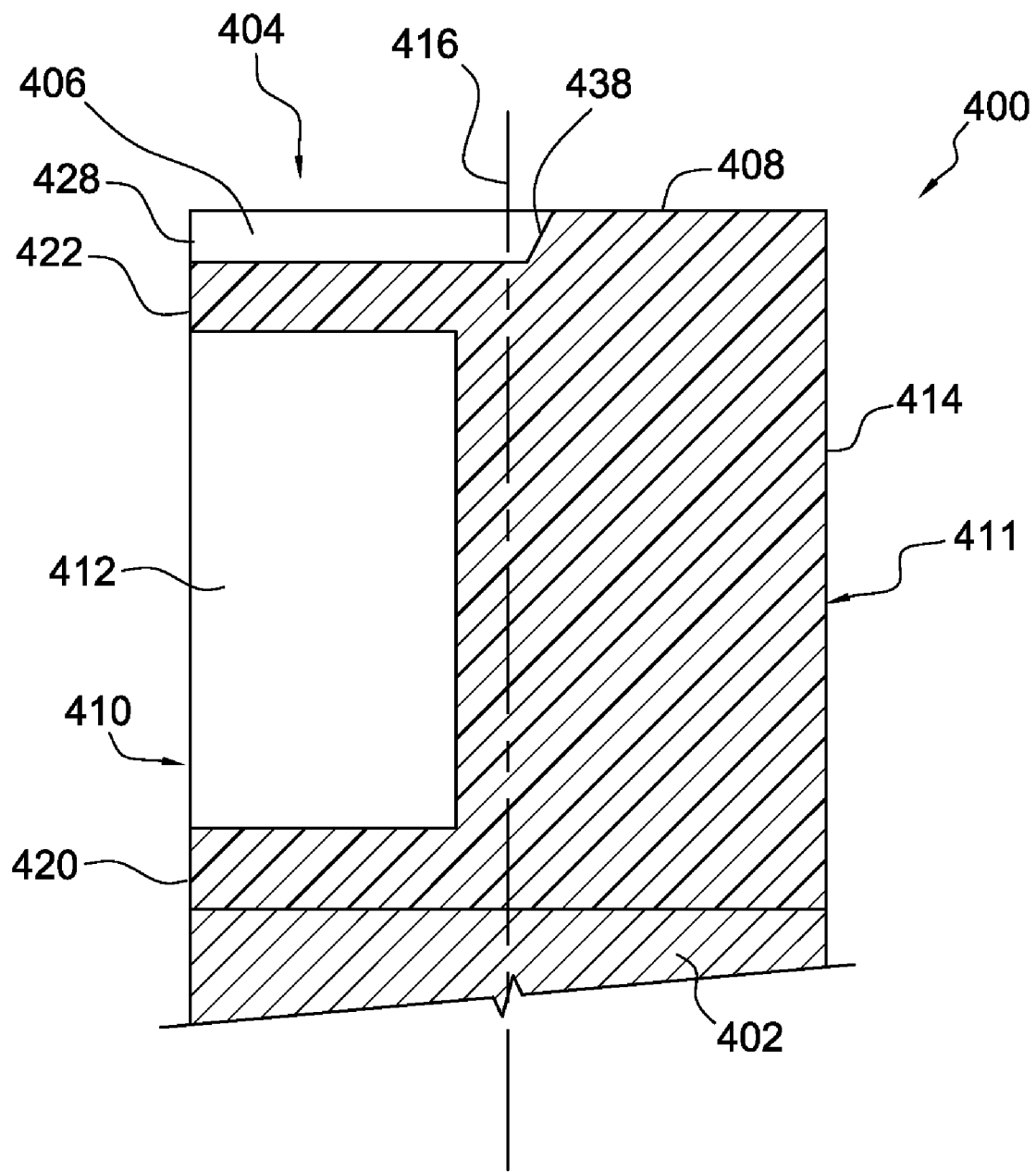
FIG. 4B is a cross-sectional view of the tire in FIG. 4A.
Figure 4C:
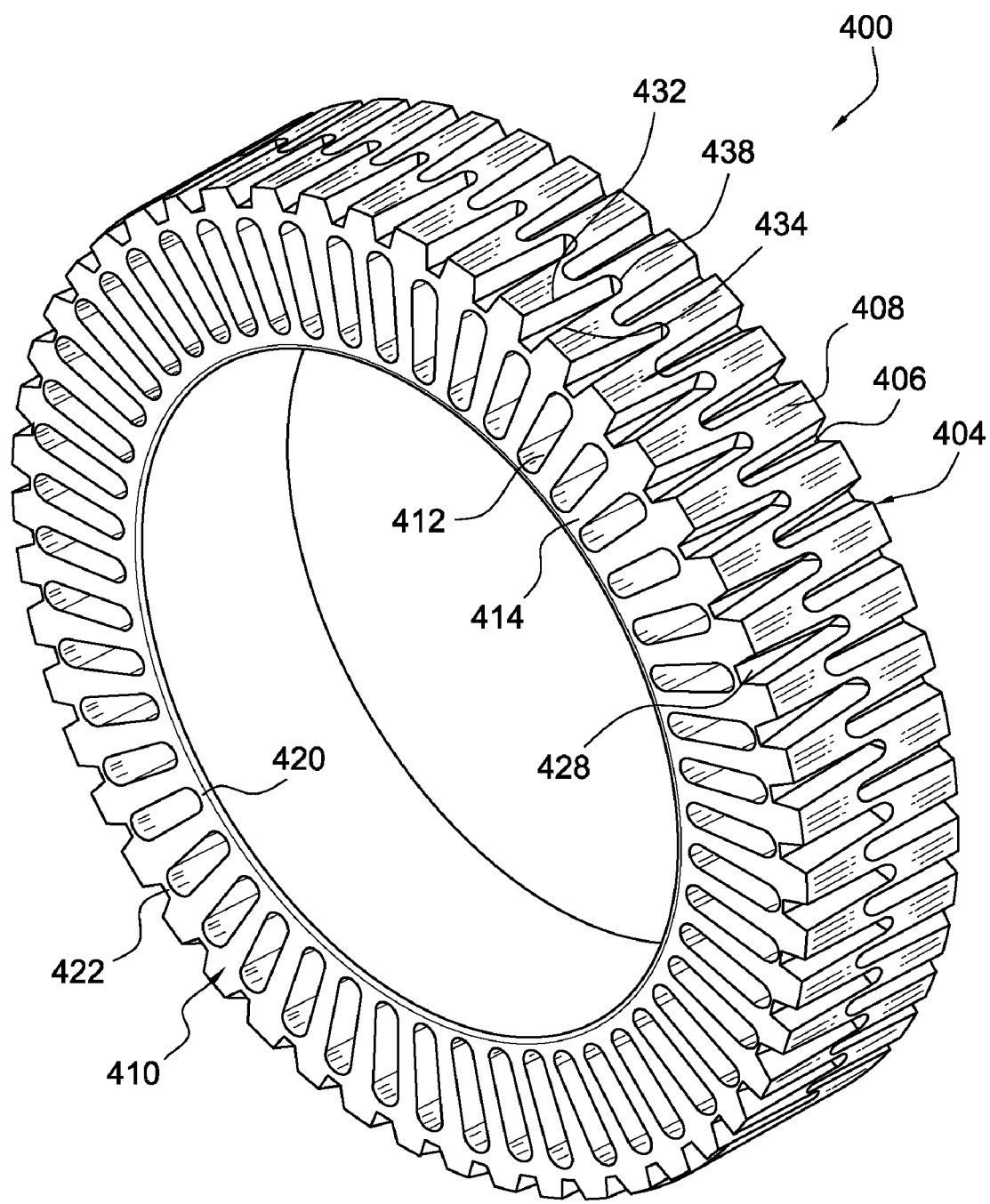
FIG. 4C is a perspective view of the tire in FIG. 4A.
Figure 4D:
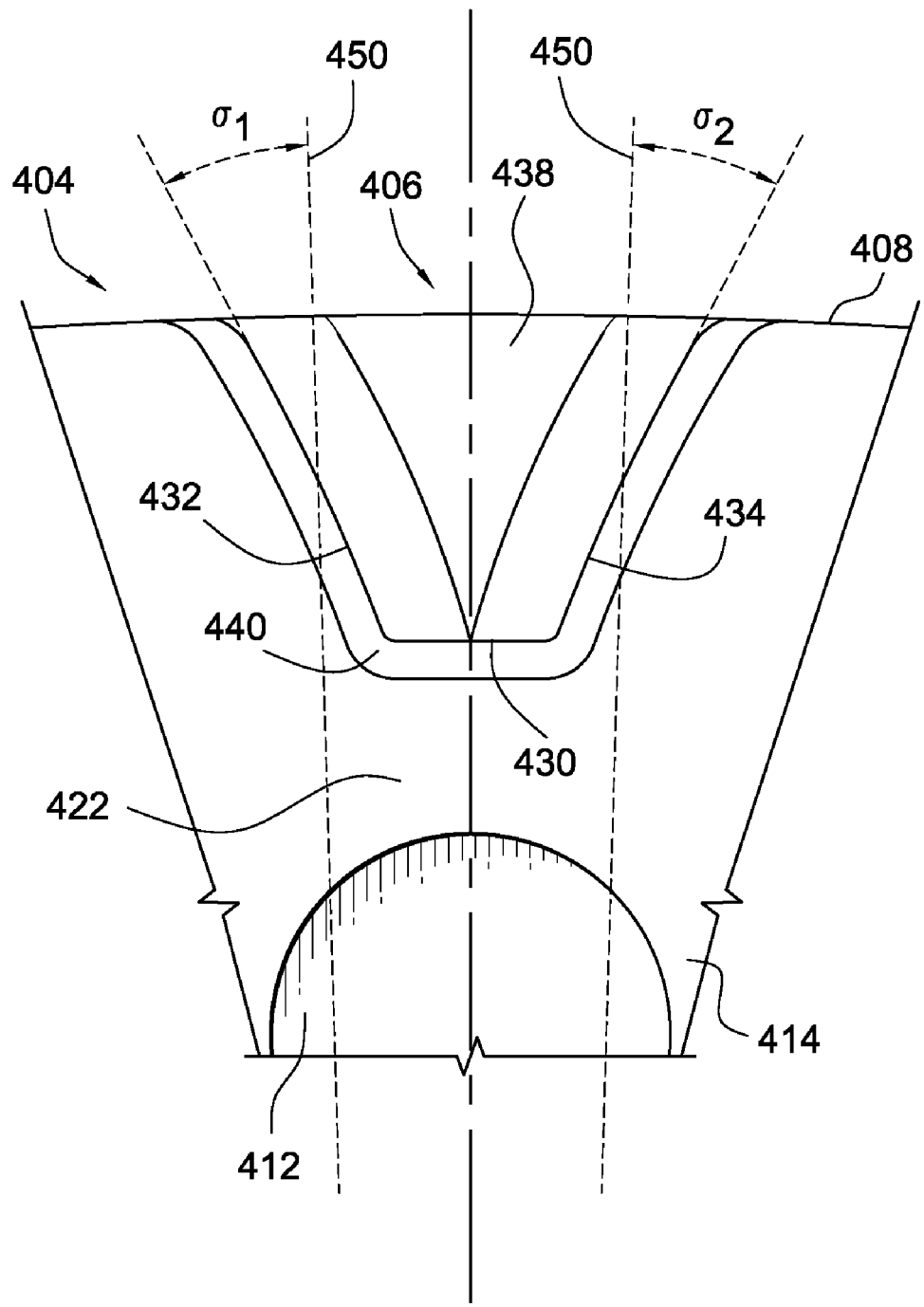
FIG. 4D is a detailed side view of the tread groove shown in FIG. 4A.
Figure 4E:
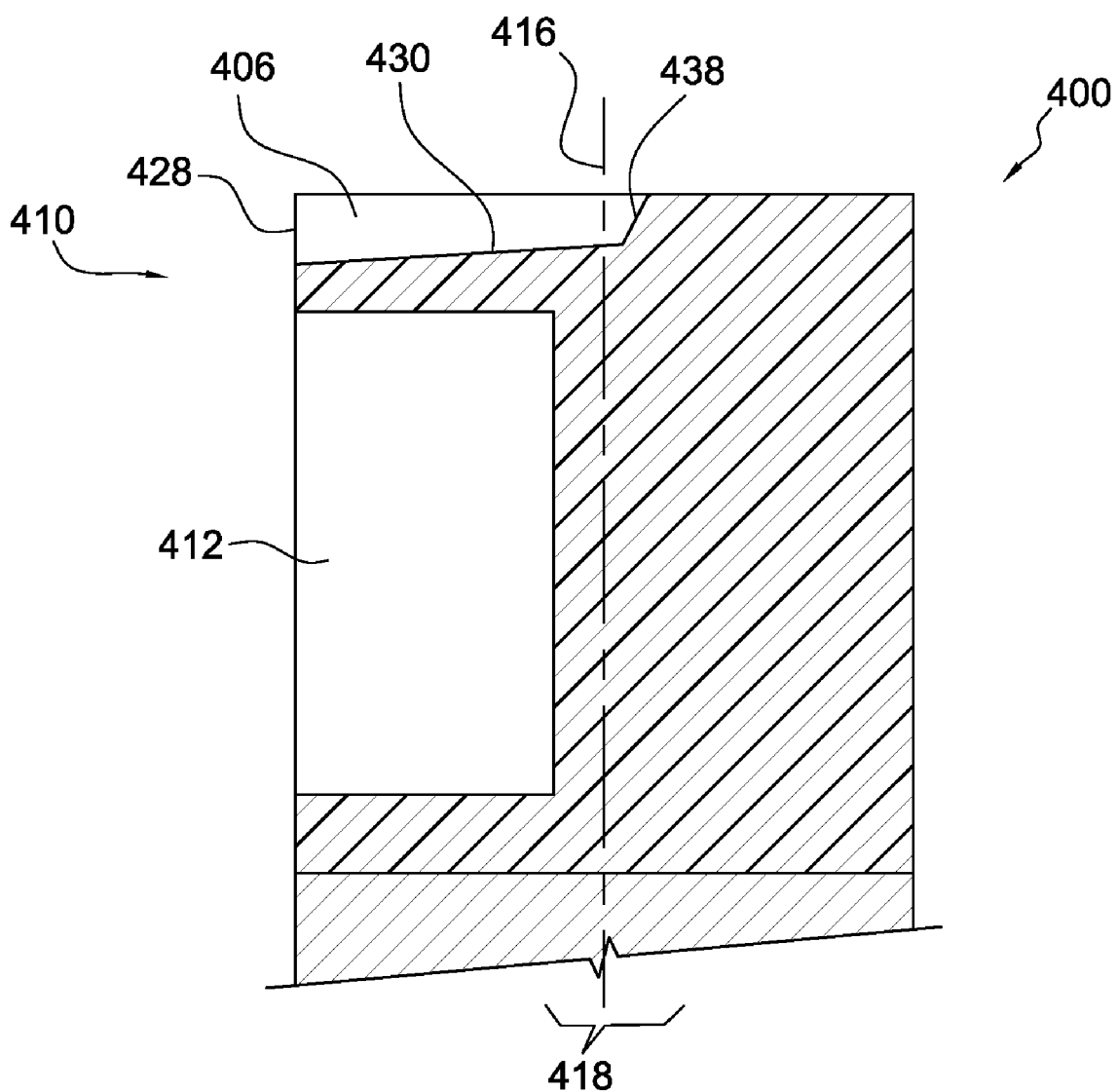
FIG. 4E is a cross-sectional view of the tire having a tapered base.

As shown in FIG. 4D, tread groove 406 is aligned with cavity 412, such that the width of the tread groove 412 at the outermost surface is approximate to the width of cavity 412. Further, base 430 is also aligned with cavity 412 and has a width that is smaller than the width of tread groove 412 at the outermost surface. Both widths decrease from sidewall 410 toward closed wall 438.

In one embodiment, tire 400 is used on OTR vehicles that operate in mines, such as open pit mines or underground mines, e.g., gold mines, platinum mines, diamond mines, copper mines, coal mines, etc. These mines may have several obstructions on the ground that may become lodged into the tires of the OTR vehicles, thus causing tearing of the tire and reducing the operational lifetime of the tire. One advantage of tire 400 shown in FIGS. 4A-4D is that the angled walls reduce the tendency of such obstructions to become lodged into tire 400. Further, when tire 400 encounters an obstruction the angled tread groove wall may inhibit the lodgment of the obstruction and/or may tend to dislodge any obstructions easier and quicker than a straight tread groove wall. For example, as tire 400 rolls on the ground, rocks trend to dislodge much more easily from angled walls as shown in FIGS. 4A-4D than straight walls as shown in FIGS. 1A-1D. As such, the angled walls inhibit obstructions from becoming enlodged and thus may improve the operational lifetime of tire 400 and reduce wear and tear on the tires caused by the obstructions.

FIGS. 5A-5F are various angled groove walls 532 and 534 for tires 500 in accordance with one or more embodiments of the present invention. As shown in FIGS. 5A-5F, the angle of the wall is measured from the mid-point 562, being the point along the wall that is equal-distance between the plane of the tread surface and the plane of the base. In FIG. 5A, walls 532 and 534 are within the plane 560 and define angle .sigma.. At the sidewall of tire 500, the angle .sigma. is measured relative to the equatorial plane 550 at the midpoint 562 of wall 534. In FIG. 5A, each wall 532, 534 meets the surface of the tread 504 and base 530 at a hard corner to formed an abrupt corner that is not rounded or smooth. FIG. 5B is similar to FIG. 5A except the base 530 is a hard corner connecting walls 532 and 534. In FIG. 5C, each wall 532, 534 is rounded near the surface of the tread 504, but has hard corners near the base 530. FIG. 5D illustrates walls 532 and 534 that are the reverse of FIG. 5C and the walls 532 and 534 have hard corners near the surface of the tread 504 and are rounded near the base 530. In FIG. 5E, walls 532 and 534 are rounded near both the surface of the tread 504 and base 530. Mid-point 562 in FIG. 5E may be near the inflection point of walls 532 and 534. In FIG. 5E, each of the walls 532 and 534 lie substantially outside of the plane 560 formed by the angle. In FIG. 5F, only wall 534 is angled, while wall 532 is aligned with the equatorial plane of tire 500. Wall 534, although shown as having a groove wall similar to FIG. 5A, may have any of the angled groove walls shown in FIGS. 5B-5E. In further embodiments tread groove may comprise walls having any combination of the walls shown in FIGS. 5A-5F.

Figure 6:
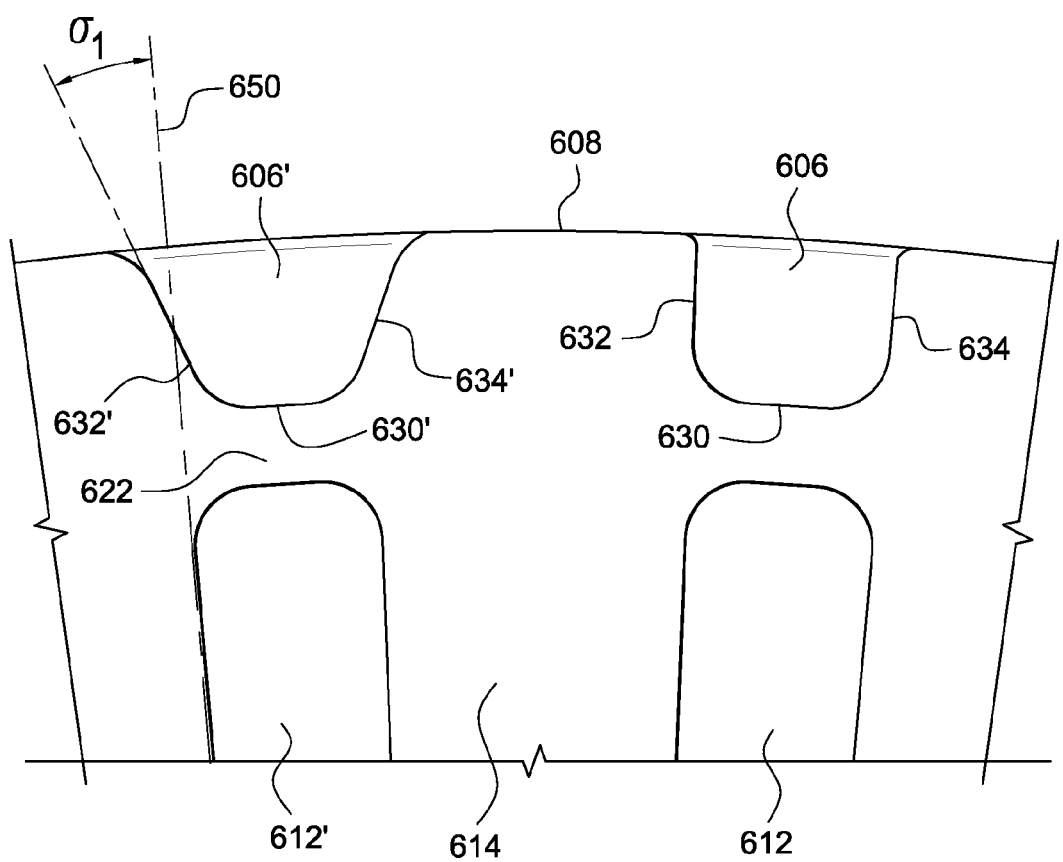
FIG. 6 is a detailed side view of a tire having alternating angled tread grooves constructed in accordance with an embodiment of the present invention.

In one embodiment, there may be a combination of tread grooves having straight and angled walls, as shown in FIG. 6. Tire 600 in FIG. 6 is shown as having a cavities 612, 612' and rib 614 on sidewall 610. Cavity 612 is aligned with tread groove 606 and separated from tread groove 606 by outer hoop 622. Cavity 612' is aligned with tread groove 606' and separated from tread groove 606' by outer hoop 622. Tread 604 comprises tread footprint 608, and tread grooves 606, 606'. Tread groove 606 comprises a base 630, first wall 632, and second wall 634. Tread groove 606 has straight walls 632, and 634. Tread groove 606' comprises a base 630', first wall 632', and second wall 634'. Tread groove 606' has angled walls 632' and 634', relative to the equatorial plane 650, as defined throughout this specification. Tread grooves 606 and 606' may alternate around the entire circumference of tread surface 604. It should also be understood that a combination of alternating tread grooves as shown in FIG. 6 may be such that all the tread grooves opening on one sidewall have angled walls while the opposing tread grooves have straight walls is also contemplated by the embodiments of the present invention.

The configurations of cavities/grooves shown in FIGS. 2A and 3A may also be combined with the angled tread grooves shown in FIG. 1D, FIG. 4D, FIGS. 5A-5F, and FIG. 6.

The tire assembly of the present invention may support 9,000 kg to 91,000 kg per tire (about 20,000 lbs to 200,000 lbs per tire), e.g., 18,000 kg to 68,000 kg per tire or 27,200 kg to 45,400 kg per tire. Also, such tires may support such weights when the vehicle is traveling of speeds in the range from 5 to 100 km/hr (about 2 to 60 mph), e.g., 10 to 65 km/hr or 30 to 50 km/hr. Also, such tires may have an operational lifetime, e.g., tire life, for mining conditions of at least 500 hours, e.g., at least 750 hours or at least 1,000 hours. In particular, tires having angled walls as shown in FIGS. 4A-4D, 5A-5F, and 6 may have increased operational lifetime of from 500 to 15,000 hours, e.g., 750 to 8,000 hours or 1,000 to 3,000 hours. Tires with such operational lifetimes are particularly beneficial for OTR mining vehicles.

Figure 7:
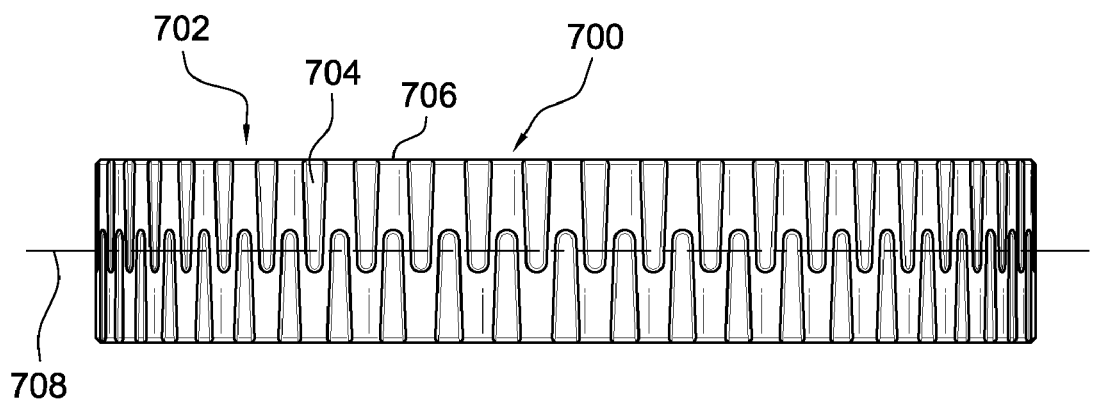
FIG. 7 is a front view of a tread pattern that crosses the equatorial plane in accordance with an embodiment of the present invention.
Figure 8:
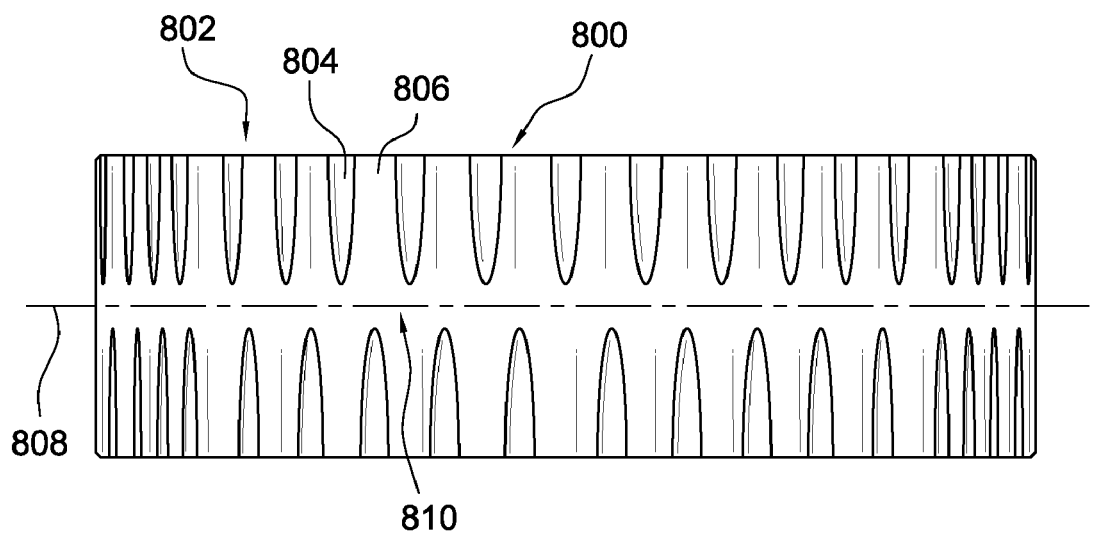
FIG. 8 is a front view of a tread pattern having a continuous footprint along the equatorial plane in accordance with an embodiment of the present invention.

In one embodiment the tread is formed together with the sidewalls using the same materials and mold. In other embodiments, a rubber tread may be added to tires of the invention. Embodiments of the invention may be used with various tread patterns as shown in FIGS. 7-8. FIG. 7 is a front view of a tire 700 having a tread pattern 702 in accordance with one embodiment of the invention. Each tread groove 704 extends from a shoulder 706 and crosses equatorial plane 808. In such embodiments, tread grooves 704 remove some material from web (not shown) positioned in line with equatorial plane 708. Even though the web has less material, the overlapping position of groove 704 with respect to the sidewall cavities, as shown in FIG. 1C, unexpectedly provides sufficient strength for tire 700 and reduced stress and strain distribution across the tread.

FIG. 8 is a front view of a tire 800 having a tread pattern 802 in accordance with another embodiment of the invention. As shown, each tread groove 804 extends from a shoulder 806 and ends short of a equatorial plane 808. The central web (not shown) is positioned in line with equatorial plane 808 and contacts the ground by a continuous footprint 810.

In one embodiment, a tire tread may combine grooves which extend past the equatorial plane with grooves that do not extend pass the equatorial plane.

In FIGS. 7 and 8, tread grooves 704, 804 have a similar shape and spacing around the outer circumference of tire 700, 800. Either tread pattern of FIGS. 7 and 8 may have the angled tread grooves as shown in FIG. 4A-4D, 5A-5F, or 6, and the shapes of tread grooves may vary and include U-shaped grooves, V-shaped grooves, rectangular shaped grooves, etc. In one embodiment, grooves may have a flat bottom and tapered sides, with a curve at the end of groove. In another embodiment, the tread grooves may have a bottom that tapers up to the end of groove and tapered sides. Various other suitable shapes include those which allow for the easy removal of the mold used to make tire.

The tire of the present invention may be made using the following process and the exemplary mold assembly 1000 shown in FIG. 10. Of course, other processes and mold designs may be used to form the tires of the present invention, and the process provided below is merely exemplary. Processes of the present invention provide for molding a tire having an outside diameter of approximately 25 inches (64 cm) to 190 inches (483 cm) and thus requires several tons of raw material or resin. As discussed above, a preferred polyurethane elastomer may comprise a low free MDI polyurethane prepolymer and a low free MDA curative.

The process of the present invention may be divided into two charging stages, for each material in the blend, and a molding stage. In the first charging stage, a drum containing low free MDI polyurethane prepolymer is melted at a temperature of 50±20° C. for at least 18 hours prior to use. Note that while one drum is discussed for purposes of clarity, multiple drums may be used depending on the size of the tire to be produced and size of the drums. While melting the prepolymer, a drum of the low free MDA curative is placed on a tumbler for at least 12 hours. In addition, the mold is heated to 45±20° C. Once the drum of low free MDI polyurethane prepolymer is melted, the polyurethane prepolymer is pumped into a mixing vessel. The low free MDI polyurethane prepolymer is pumped into the mixing vessel such that the exposure to air is minimized. Preferably the mixing vessel has a pressure of about 50 mBar absolute or lower. The vacuum pressure may have to be restored when pumping the low free MDI polyurethane prepolymer into the mixing vessel. Once the first charging stage is completed, a pressure of 20 mBar or less is applied to the mixing vessel and the low free MDI polyurethane prepolymer may be allowed to stand until substantially all bubbling has ceased, e.g., about 30 minutes.

Next, the second charging stage of the low free MDA curative is added to the mixing vessel. In this stage, the agitator of the mixing vessel should be operational to inhibit an improper charging of the low free MDA curative. In one embodiment, the agitator should be operating at 50 rpm or greater. Improper loading of low free MDA curative may be exhibited by permanent white specks in the product. The low free MDA curative is added at a rate of about 4 kg/min to the mixing vessel under similar pressure as the first stage. The temperature of mixing vessel should be about 45±20° C.

during the second stage. Once the second charging stage is completed, a pressure of 20 mBar or less is applied to mixing vessel and the mixture of low free MDI prepolymer and low free MDA curative may be allowed to degas under vacuum and agitation until substantially all bubbling has ceased, e.g., about 1 hour. In one embodiment, the mixing forms a blend of the low free MDA curative and low free MDI polyurethane. In one embodiment of the present invention it is advantageous to achieve a maximum temperature of the blend without curing the blend prior to pouring the mold.

After the charging steps, the blend is poured into the mold that is kept a low temperature, such as about 45±20° C., i.e., non-preheated. In some embodiments, release and bonding agents may be applied to different portions of the mold prior to adding the blend. The agitator is shut off and the mixture is filtered prior to being added to the mold. Once the mold is completely filled, the halves and/or plates of mold assembly are closed and clamped together. The mold temperature is raised to 125±25° C. for about 16 to 24 hours to fully cure the material. The mold is then opened and the tire is released. Alternately, the tire may be removed from the mold after approximately 4-8 hours at 125±25° C. depending on thickness and post cured at this temperature outside of the mold.

Figure 9:
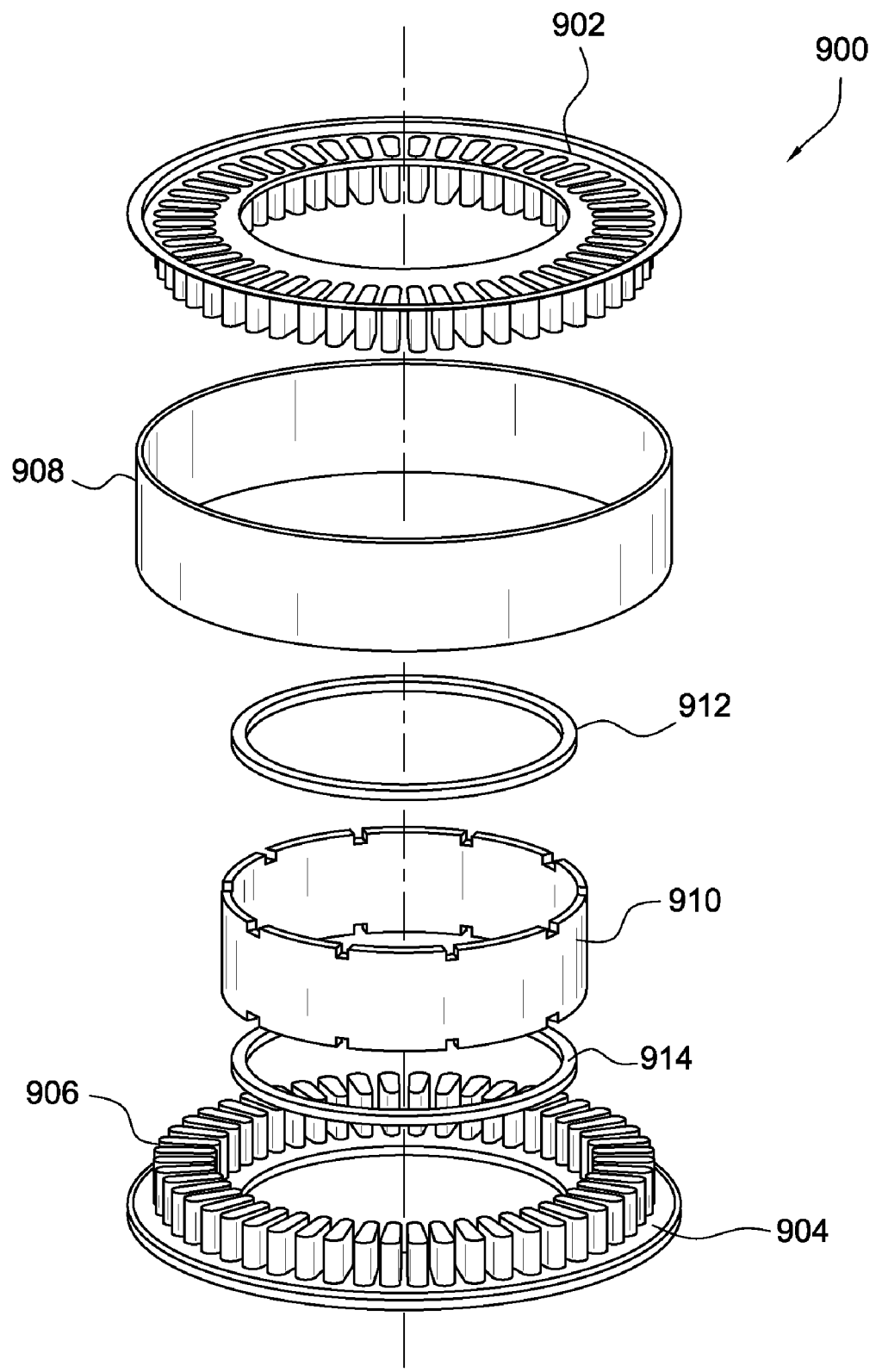
FIG. 9 is an exploded view of a tire mold in accordance with an embodiment of the present invention.

Various molds may be used to make the tires of the present invention. In FIG. 9 there is shown a mold 900 to make a tire having sidewall cavities. In FIGS. 10A-10D, there is shown a mold 900 to form a tire having structurally integrated ribs, sidewall cavities and tire tread grooves. In FIG. 9, mold 900 assembly comprises two halves 902, 904. Each half 902, 904 has inverse or negative protrusions 906 that correspond to the cavities of tire. Each half 902, 904 is preferably made from hardened steel, pre-hardened steel, aluminum, and/or beryllium-copper alloy. Each half 902, 904 may have a heating system (not shown), such as a jacket, positioned on the outside of mold assembly 900. For purposes of clarity half 902 will be referred to as the upper half and half 904 will be referred to as the lower half. On the outer circumference of upper half 902 and lower half 904 is a tread plate 908. Tread plate 908 may have a series of cavities that correspond to the tread pattern. Alternatively, the tread may be formed from protrusions (not shown) on either or both halves 902, 904. On the inner circumference there is a rim plate 910 with an upper sealing ring 912 and lower sealing ring 914. When assembled, tread plate 908 and rim plate 910 keep protrusions 906 of upper half 902 and lower half 904 from touching. In the space between cavities the web is formed in the mold. Various clamps may be used to hold mold assembly 900 together when curing the blend. Grooves may be added to the tire formed by mold 900 or mold 900 may form a slick tire.

Figure 10A:
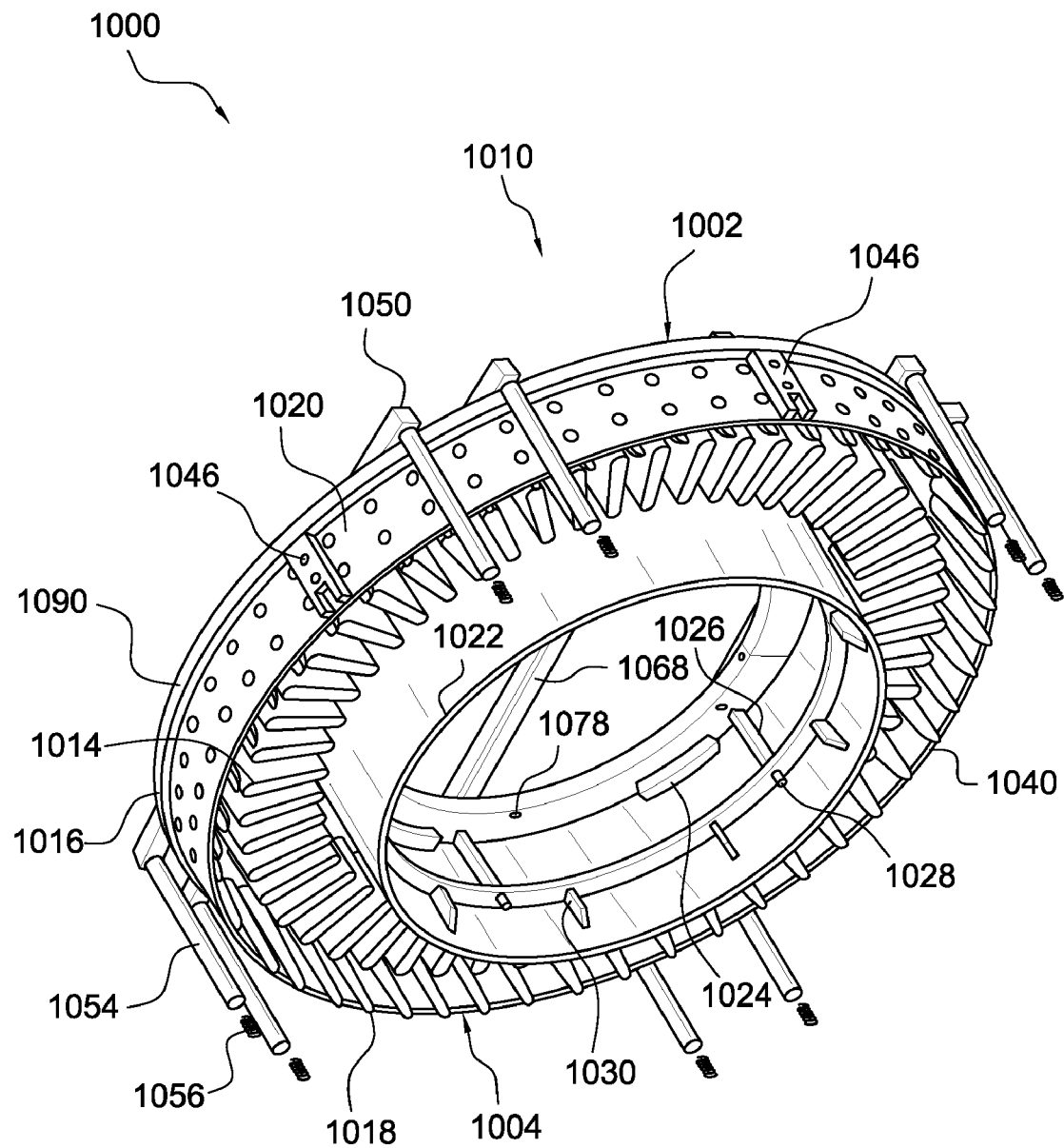
FIG. 10A is a perspective view of a top half of a mold in accordance with an embodiment of the present invention.
Figure 10B:
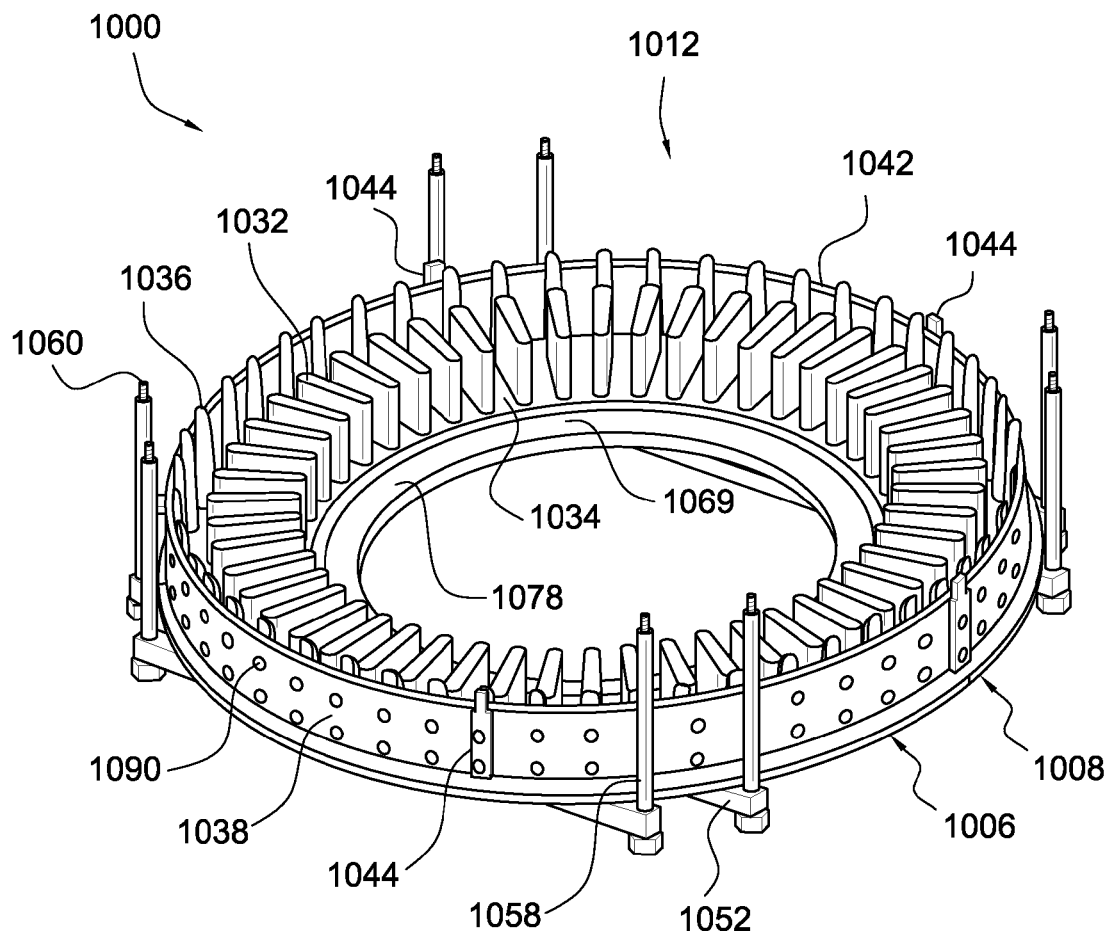
FIG. 10B is a perspective view of a bottom half of a mold in accordance with an embodiment of the present invention.

Mold 1000 in FIGS. 10A-10D may be used to manufacture a tire having an outside diameter of 140.5 inches (356.9 cm). In FIGS. 10A-10D mold 1000 comprises four plates 1002, 1004, 1006, 1008. Plates 1002 and 1004 are fastened together with bolts (not shown) to from a top half 1010, while plates 1006 and 1008 are fastened together with bolts (not shown) to from a bottom half 1012. One or more gaskets (not shown), such as O-rings, may be provided on the mechanical interface between plates 1002 and 1004 and plates 1006 and 1008. In other embodiments, plates 1002 and 1004 and plates 1006 and 1008 may be attached using other mechanical fasteners or welded together. As shown in FIG. 10A, half 1010 comprises a plurality of inverse or negative cavity protrusions 1014 extending from a base 1016 that correspond to the cavities of tire, and a plurality of inverse or negative groove protrusions 1018 extending from an outer retaining wall 1020. Half 1010 also comprises an inner retaining wall 1022 that is mounted to half 1010 by braces 1024 and supports 1026. A bonding band 1028 having supports 1030 is provided on the inner circumference of inner retaining wall 1022. As shown in FIG. 10B, half 1012 comprises a plurality of inverse or negative cavity protrusions 1032 extending from a base 1034 that correspond to the cavities of tire, and a plurality of inverse or negative groove protrusions 1036 extending from an outer retaining wall 1038. Groove protrusions 1036 may have a variety of shapes capable of producing the straight wall tread grooves in FIG. 1D, the angle walls in FIG. 4D or FIGS. 5A-5F or the alternating pattern shown in FIG. 6.

Figure 10D:
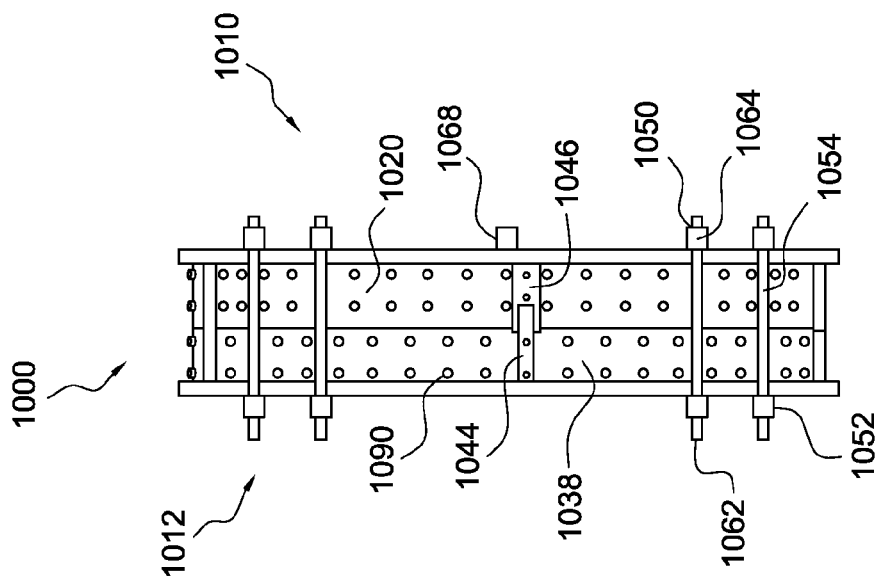
FIG. 10D is a side view of a closed mold shown in FIGS. 10A, 10B, and 10C.
Figure 10C:
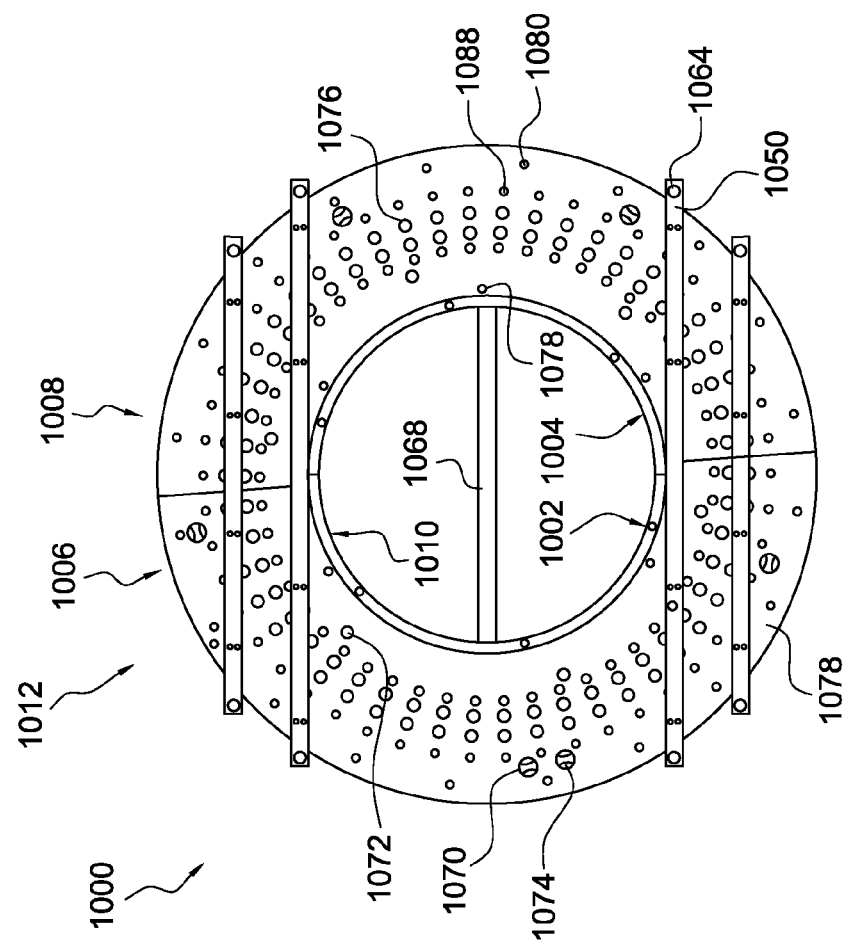
FIG. 10C is a front view of the bottom half shown in FIG. 10B.

When halves 1010 and 1012 are mated to form a closed mold 1000 as shown in FIGS. 10C and 10D, the edge 1040 of outer retaining wall 1020 abuts the edge 1042 of outer retaining wall 1038. One or more gaskets (not shown), such as an O-ring, may be provided along edge 1040, edge 1042 or both. In addition, one or more male mating members 1044 on outer retaining wall 1038 align and engage with one or more corresponding female mating members 1046 on outer retaining wall 1020. The mating connection between members 1044 and members 1046 is an interconnecting fit that may be released.

Halves 1010 and 1012 are secured by one or more support beams 1050 on half 1010 which engages connection beams 1052 on half 1012. Support beams 1050 comprise a tube 1054 and spring 1056. Connection beams 1052 comprise a pin 1058 having a threaded end 1060 and a bolted end 1062. Each pin 1058 is inserted through the respective tube 1054 such that springs 1056 are compressed and threaded end 1060 is exposed above support beam 1050. A bolt 1064 or similar fastening cap is secured to threaded end 1060. Halves 1010 and 1012 may be clamped by bolt 1064 and released by removing bolt 1064. Half 1010 also comprises a support brace 1068 that does not have any tubes or pins.

When halves 1010 and 1012 are secured together using support beams 1050 and connection beams 1052, plates 1002 and 1004 are not symmetrically aligned with plates 1006 and 1008 as shown in FIG. 10C. This offset between plates allows the cavities formed in each sidewall of tire to be offset from each other to form a tire having a configuration shown in FIGS. 1A-1D. In other embodiments, plates may be aligned, but the protrusions may be offset.

Also, when halves 1010 and 1012 are secured together, the inner retaining wall 1022 abuts a sub-base 1069 of half 1012. Inner retaining wall 1022 is also pressed against base 1034. In one embodiment, base 1034 may curve slightly upward at the point where base 1034 and inner retaining wall 1022 adjoin. A slight curve may also exist where bases 1016 and 1034 each adjoins both of the outer retaining walls 1020 and 1036 and inner retaining wall 1020.

Each plate 1002, 1004, 1006 and 1008 further comprises a plurality of holes. Fill holes 1070 are provided to allow a material to be poured into mold 1000. Vent holes 1072 are provided to allow the material in mold 1000 to be exposed to the air when curing. A sight hole 1074 is provided to allow an operator to visually inspect the material in mold 1000. Air holes 1076 are provided for each spoke formed in tire. Lift holes 1078 are provided so that halves 1010 and 1012 may be pulled parted using a press or similar machine. Bolts 1080 attach outer retaining walls 1020 and 1038 to the respective halves 1010 and 1012. Lift holes 1078 are also provided in sub-base 1069 of half 1012.

Cavity protrusions 1014 and 1034 are mounted to the respective bases 1016 and 1036 using bolts 1088. Groove protrusions 1018 and 1036 are mounted to the respective outer retaining walls 1020 and 1036 using bolts 1090. The removable protrusions may be reconfigured as necessary to mold tires having different configurations of cavities and grooves. In one embodiment cavity protrusions 1014 and 1034 are welded or otherwise adhered to the respective bases 1016 and 1036. In such embodiments, groove protrusions 1018 and 1032 may also be welded or otherwise adhered to the respective outer retaining walls 1020 and 1036. When welded, air holes 1076 may still be provided above the cavity protrusions 1014 and 1034 as shown in FIG. 10C.

As shown in FIG. 10C, half 1012 has five fill holes 1070, six vent holes 1072, and one sight hole 1074. In one embodiment there may be from 1 to 20, e.g., from 2 to 10 or from 3 to 8, fill holes 1070 on each half 1010, 1012. In one embodiment there may be from 0 to 20, e.g., from 2 to 10 or from 3 to 8, vent holes 1072 on each half 1010, 1012. In one embodiment there may be from 0 to 10, e.g., from 1 to 5 or from 2 to 4, sight holes 1074 on each half 1010, 1012. The number of air holes 1076 may vary with the number of spokes created in tire. In one embodiment there may be from 4 to 40, e.g., from 8 to 20 or from 10 to 15, lift holes 1078 on each half 1010, 1012.

In one embodiment, the inner retaining wall 1022 may be welded or adhered directly to half 1010. In such embodiments, braces 1024 and supports 1026 may provide additional lateral support for inner retaining wall 1022.

Although not shown a heating system or heating jackets may surround all or a portion of the molds shown in FIG. 10 and FIGS. 10A-10D. Such heating systems may heat the material in the mold to cure and harden the material. In one embodiment, a heating system is fitted against the inner side of the inner retaining wall 1020 and supported by brace 1068.

While this invention has been described with reference to illustrative embodiments and examples, the description is not intended to be construed in a limiting sense. Thus, various modifications of the illustrative embodiments, as well as other embodiments of the invention, will be apparent to persons skilled in the art upon reference to this description. It is therefore contemplated that the appended claims will cover any such modifications or embodiments.

All publications, patents and patent applications referred to herein are incorporated by reference in their entirety to the same extent as if each individual publication, patent or patent application was specifically and individually indicated to be incorporated by reference in its entirety.

PROPHETIC EXAMPLE 1

Materials

Adriprene™ LFM 2450 is a MDI terminated PCL prepolymer mixture having low free MDI content (typically 3.0%-4.0%) due to a monomer removal step in manufacture. The NCO content of the prepolymer is about 4.35% to 4.55% and the equivalent weight is about 923 to 966. Adriprene™ LFM 2450 may be cured with Caytur™ curatives to yield a high performance 93-95A elastomer, 59% rebound. Adriprene™ LFM 2450 is particularly suited for industrial non-pneumatic tires and wheels.

Caytur 31™ and Caytur™ 31-DA are blocked delayed action amine curatives for use primarily with isocyanate terminated urethane prepolymers. Such curatives comprise of a complex of MDA and sodium chloride dispersed in a plasticizer (dioctyl phthalate in case of Caytur 31 and dioctyl adipate in case of Caytur 31-DA) and optionally a pigment. Caytur 31 has a very low free MDA content (typical <0.5%). At room temperature, such curatives are virtually non-reactive. However at 115° C.-160° C., the salt unblocks and the freed MDA reacts rapidly with the prepolymer to form a tough elastomer. Amine group concentration is 5.78% in Caytur 31 and Caytur 31-DA. Hence the equivalent weight is 244 for Caytur 31 and Caytur 31-DA. These groups are blocked by sodium chloride.

ADIPRENE™ LFM 2450 cured with Caytur™ 3 IDA, both made by Chemtura Corporation, is used to make a prophetic tire having a configuration similar to FIGS. 1A-1D.

Table 2 shows a computer simulated comparison of a tire of FIGS. 1A-1D constructed with staggered cavities and substantially overlapping grooves of Example 1 with a conventional pneumatic rubber tire and a comparative solid polyurethane tire. The comparative solid polyurethane tire has a similar dimensions of a pneumatic rubber tire without any cavities or grooves.

TABLE 2

| Tire | Tire Weight | Tire Deflection | Max Speed | Ground Pressure | Rim Outside Diameter |
|---|---|---|---|---|---|
| Pneumatic Rubber (Actual) | 8,000 lbs (3,629 kg) | 18.9% (7.8 in) (20 cm) | 30 mph (48 km/h) | 102 psi (703 kPa) | 57 in (145 cm) |
| Comparative Solid polyurethane (Calculated) | 22,600 lbs (10,250 kg) | 8.6% (3.6 in) (9.1 cm) | 2.0 mph (3.2 km/h) | 77 psi (531 kPa) | 57 in (145 cm) |
| Example 1 (FEA) | 7,100 (lbs) (3,220 kg) | 7.8% (1.8 in) (4.6 cm) | 30 mph (48 km/h) | 160 psi (1,103 kPa) | 94 in (239 cm) |

As shown in the results of Table 2, the tire of Example 1 has similar characteristics as a conventional pneumatic rubber tire, which is surprising in view of the characteristics of the comparative solid polyurethane tire. Example 1 is made of a polyurethane elastomer, similar to the comparative solid polyurethane tire, but is lighter than the comparative solid polyurethane tire due to the presence of cavities and grooves therein. Further, the comparative solid polyurethane tire is subject to interior melt down due to the inability to dissipate heat generated during the rotation of the solid polyurethane tire. It is believed that the improved performance of Example 1 is attributable to the configuration of cavities and grooves.

What is claimed is:

1. A non-pneumatic tire comprising:
radially aligned side cavities on a first sidewall that are staggered with respect to radially aligned and laterally opposing side cavities on a second sidewall; and
tread grooves laterally extending from the first sidewall, wherein all tread grooves extending from said first sidewall are each in substantial radial alignment with the respective cavity and
tread grooves laterally extending from the second sidewall, wherein all tread grooves extending from said second sidewall are each in substantial radial alignment with the respective cavity and each being substantially offset from the respective opposing tread groove, wherein each tread groove comprises a first wall having a first angle of 5° to 65° relative to the radial direction, wherein the tread grooves extend from the respective first sidewall or second sidewall, but not to the opposing sidewall;
wherein the ratio of all side cavities on said first sidewall to all tread grooves extending from said first sidewall is 1:1; and wherein the ratio of all side cavities on said second sidewall to all tread grooves extending from said second sidewall is 1:1; and
wherein the tire has a unitary polyurethane structure and wherein the tire has a diameter of 60 inches to 159 inches.

2. The non-pneumatic tire of claim 1, wherein the first angle is an open angle.

3. The non-pneumatic tire of claim 1, wherein each of the tread grooves has a second wall having a second angle of 5° to 65° relative to the radial direction.

4. The non-pneumatic tire of claim 3, wherein the first angle is equal to the second angle.

5. The non-pneumatic tire of claim 3, wherein the first angle and the second angle are open angles.

6. The non-pneumatic tire of claim 1, wherein each tread groove has a surface width that decreases toward a centerline of the tire.

7. The non-pneumatic tire of claim 1, wherein each tread groove has a maximum surface width of from 2 cm to 38 cm.

8. The non-pneumatic tire of claim 1, wherein the maximum surface width for each tread groove is equal to or less than a maximum sidewall width of the corresponding side cavity with which the tread groove is in substantial radial alignment.

9. The non-pneumatic tire of claim 1, wherein each tread groove has a maximum surface width and a base having a maximum base width, and wherein the maximum surface width is greater than the maximum base width.

10. The non-pneumatic tire of claim 9, wherein the base is substantially flat.

11. The non-pneumatic tire of claim 9, wherein the base is tapered.

12. The non-pneumatic tire of claim 9, wherein each of the tread grooves has a maximum depth of from 1 cm to 30 cm.

13. A vehicle comprising one or more of the non-pneumatic tires of claim 1.

14. The non-pneumatic tire of claim 1, wherein the tire comprises no tread grooves that are substantially offset from the respective cavity.

15. A non-pneumatic tire comprising:
radially aligned side ribs on a first sidewall that are staggered with respect to radially aligned and laterally opposing side ribs on a second sidewall; and
tread grooves laterally extending from the first sidewall, wherein all tread grooves extending from the first sidewall are substantially radially offset relative to the respective side rib;
tread grooves laterally extending from the second sidewall, wherein all tread grooves on the second sidewall are substantially radially offset relative to the respective side rib and each being substantially offset from the respective opposing tread groove, wherein each of the tread grooves has a first wall having an angle of 5° to 65° relative to the radial direction, wherein the tread grooves extend from the respective first sidewall or second sidewall, but not to the opposing sidewall; and
wherein the ratio of all side ribs on said first sidewall to all tread grooves extending from said first sidewall is 1:1;

and the ratio of all side ribs on said second sidewall to all tread grooves extending from said second sidewall is 1:1;

wherein the tire has a unitary polyurethane structure and wherein the tire has a diameter of 60 inches to 159 inches.

16. The non-pneumatic tire of claim 15, wherein each of the tread grooves has a second wall having a second angle of 5° to 65° relative to the radial direction.

17. The non-pneumatic tire of claim 15, wherein the tire comprises no tread grooves that are substantially aligned with the respective rib.

18. A non-pneumatic tire comprising:
an inner circumferential member;
an outer circumferential member;
a central web connecting the inner and outer circumferential members;
first and second sidewalls opposing one another;
radially aligned ribs extending from the opposing sidewalls to the central web and defining radially aligned side cavities, wherein ribs on one side of the central web are staggered relative to ribs on an opposite side of the central web; and
laterally extending tread grooves disposed within an outer surface of the outer circumferential member and laterally extending inwardly from the first sidewall but not to the opposing sidewall, wherein each tread groove is substantially offset relative to the respective rib, and tread grooves disposed within the outer surface of the outer circumferential member and laterally extending inwardly from the second sidewall but not to the opposing sidewall, wherein each tread groove is substantially offset relative to the respective rib and each tread groove is substantially offset from the respective opposing tread groove, wherein each of the tread grooves has a first wall with an angle of 5° to 65° relative to the radial direction, and wherein the ratio of all side ribs on said first sidewall to all tread grooves extending from said first sidewall is 1:1; and the ratio of all side ribs on said second sidewall to all tread grooves extending from said second sidewall is 1:1;

and wherein the tire has a unitary polyurethane structure and wherein the tire has a diameter of 60 inches to 159 inches.

19. The non-pneumatic tire of claim 18, wherein each of the tread grooves has a second wall having a second angle of 5° to 65° relative to the radial direction.

20. The non-pneumatic tire of claim 18, wherein the tire comprises no tread grooves that are substantially aligned with the respective rib.

* * * * *